US012226702B2

(12) United States Patent
Lal et al.

(10) Patent No.: US 12,226,702 B2
(45) Date of Patent: Feb. 18, 2025

(54) METRIC-DRIVEN IMPROVEMENTS OF VIRTUAL REALITY EXPERIENCES

(71) Applicant: Adeia Guides Inc., San Jose, CA (US)

(72) Inventors: Dhananjay Lal, Englewood, CO (US); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 252 days.

(21) Appl. No.: 17/899,887

(22) Filed: Aug. 31, 2022

(65) Prior Publication Data
US 2024/0066406 A1    Feb. 29, 2024

(51) Int. Cl.
```
A63F 13/67    (2014.01)
A63F 13/47    (2014.01)
A63F 13/49    (2014.01)
A63F 13/52    (2014.01)
A63F 13/58    (2014.01)
G06F 3/01     (2006.01)
G06T 19/00    (2011.01)
```

(52) U.S. Cl.
CPC ............ *A63F 13/67* (2014.09); *A63F 13/47* (2014.09); *A63F 13/49* (2014.09); *A63F 13/52* (2014.09); *A63F 13/58* (2014.09); *G06F 3/013* (2013.01); *G06T 19/003* (2013.01)

(58) Field of Classification Search
CPC .......... A63F 13/67; A63F 13/47; A63F 13/49; A63F 13/52; A63F 13/58; A63F 13/212; G06F 3/013; G06F 3/011; G06T 19/003
USPC ........................................................ 463/23
See application file for complete search history.

(56) References Cited

U.S. PATENT DOCUMENTS

| | | | |
|---|---|---|---|
| 10,300,371 B2 * | 5/2019 | Ghaffari | A63F 13/215 |
| 2012/0032877 A1 * | 2/2012 | Watkins, Jr. | G06F 1/1677 |
| | | | 345/156 |
| 2015/0061970 A1 | 3/2015 | Kim et al. | |
| 2017/0095732 A1 * | 4/2017 | Ghaffari | A63F 13/212 |
| 2017/0278306 A1 | 9/2017 | Rico | |
| 2018/0262362 A1 | 9/2018 | Goldstein et al. | |
| 2021/0035243 A1 * | 2/2021 | Farooqi | G06Q 30/02 |
| 2022/0039059 A1 | 2/2022 | Nguyen et al. | |

OTHER PUBLICATIONS

U.S. Appl. No. 17/899,888, filed Aug. 31, 2022, Dhananjay Lal.
U.S. Appl. No. 17/899,889, filed Aug. 31, 2022, Dhananjay Lal.

* cited by examiner

*Primary Examiner* — Pierre E Elisca
(74) *Attorney, Agent, or Firm* — Haley Guiliano LLP

(57) ABSTRACT

Systems and methods for obtaining metrics relating to an extended reality experience and using the obtained metrics to perform remedial actions, such as managing user motion sickness, determining user performance relating to a designed game difficulty, and performing home automation are disclosed. The methods include determining a starting and ending checkpoint in an extended reality experience. Data from a plurality of users as they navigate between the determined checkpoints is obtained and used to determine a metric, such as a median, average, or other representative data. The current user's navigation through the same checkpoints is monitored and compared with the metric. The results from the comparison are used to enhance extended reality experience, which includes customizing the experience for motion sickness, game difficulty level, and home automation.

21 Claims, 22 Drawing Sheets

| Monitoring Attribute | Detail Description | Factor Median/Average Data | Factor Current Data | Threshold |
|---|---|---|---|---|
| Acceleration | Curve 1 in virtual roller coaster | BPM 72 | BPM 75 | +/- 5 |
| Acceleration | Curve 2 in virtual roller coaster | BPM 77 | BPM 84 | +/- 5 |
| At time t=t1 | Rotation in a virtual room | Body temperature 98F | Body temperature 100F | +/- 1F |
| After 30 mins of game play | Responsiveness | Scoring percentage 67% | Scoring percentage 53% | +/- 10% |

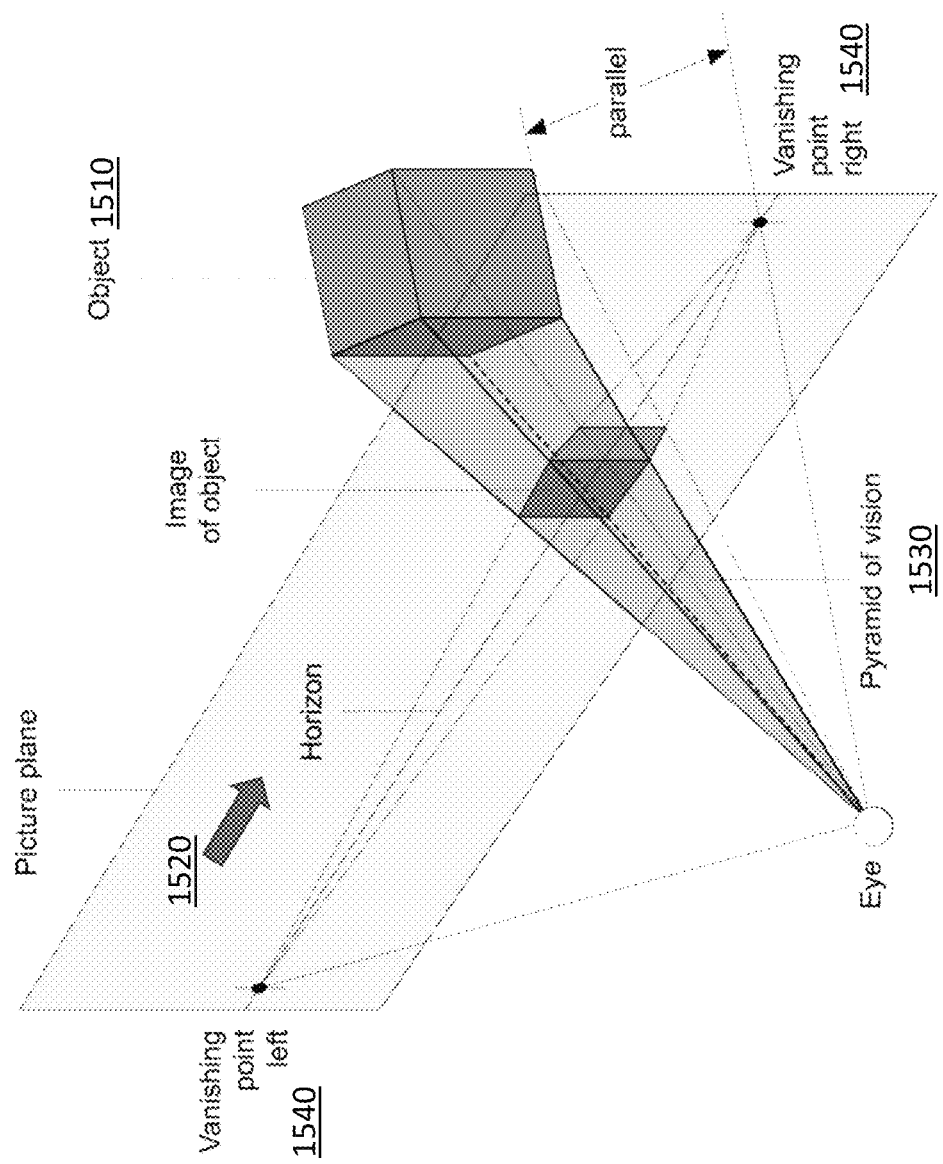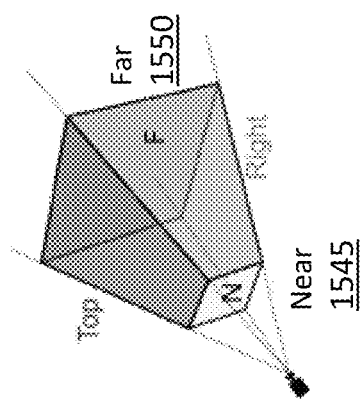
FIG. 15

| Time | HMD Vector | LH Controller Vector | RH Controller Vector | Assets in View | Interactions / User Activity | CPU Util. | GPU Util. |
|---|---|---|---|---|---|---|---|
| t = T | $(x_1, y_1, z_1, qw_1, qx_1, qy_1, qz_1)$ | $(x_{1a}, y_{1a}, z_{1a}, qw_{1a}, qx_{1a}, qy_{1a}, qz_{1a})$ | $(x_{1b}, y_{1b}, z_{1b}, qw_{1b}, qx_{1b}, qy_{1b}, qz_{1b})$ | Box-1, Box-2, Box-3, Box-4, Flying-Box-1 | | 15% | 68% |
| t = 2T | $(x_2, y_2, z_2, qw_2, qx_2, qy_2, qz_2)$ | $(x_{2a}, y_{2a}, z_{2a}, qw_{2a}, qx_{2a}, qy_{2a}, qz_{2a})$ | $(x_{2b}, y_{2b}, z_{2b}, qw_{2b}, qx_{2b}, qy_{2b}, qz_{2b})$ | Box-3, Box-4, Box-5, Box-6, Box-7 | Open (Box-7):timestamp | 10% | 41% |
| t = 3T | $(x_3, y_3, z_3, qw_3, qx_3, qy_3, qz_3)$ | $(x_{3a}, y_{3a}, z_{3a}, qw_{3a}, qx_{3a}, qy_{3a}, qz_{3a})$ | $(x_{3b}, y_{3b}, z_{3b}, qw_{3b}, qx_{3b}, qy_{3b}, qz_{3b})$ | Box-7, Box-8, Box-9, Box-10, Box-11, Box-1 | Open (Box-8):timestamp, Close( Box-7):timestamp, Open (Box-11):timestamp | 7% | 33% |
| ⋮ | | | | | ⋮ | | |

FIG. 18

| Time | Assets in View | Interactions / User Activity | Interaction Opportunities |
|---|---|---|---|
| t = T | Box-1, Box-2, Box-3, Box-4, Flying-Box-1 | | Open (Box-1), Open (Box-2), Open (Box-3), Open (Box-4), Open (Flying-Box-1) |
| t = 2T | Box-3, Box-4, Box-5, Box-6, Box-7 | Open (Box-7):timestamp | Open (Box-3), Open (Box-4), Open (Box-5), Open (Box-6), Open (Box-7) |
| t = 3T | Box-7, Box-8, Box-9, Box-10, Box-11, Box-1 | Open (Box-8):timestamp, Close (Box-7):timestamp, Open (Box-11):timestamp | Close (Box-7), Open (Box-8), Open (Box-9), Open (Box-10), Open (Box-11) |
| ... | ... | ... | ... |

FIG. 19

| Content Improvement | Metrics available | Suggested Actions |
|---|---|---|
| Highlight and redirect the user towards an object or get them to interact with it, perform a desired action or train to perform a certain behavior | Median path taken by users, median orientation for each point along the path, Assets in View, Interactions / User Activity | Display arrows, highlight objects with thick/contrasting color border to point the user to the assets or other interaction opportunities, change the spatial layout/map of the experience, provide behavioral training text and 3D visualization |
| Validate the difficulty in clearing a certain level in a gaming experience | Time taken to complete a set of tasks or a sequence of tasks, time between completing tasks | Remove or add challenges and obstacles to effect the time, offer more interaction opportunities to uncover clues |
| Save computational expense by reducing the Level-of-detail (LoD) on assets that may have initially been rendered in high fidelity but are not in view for a significant portion of the experience based on aggregate user behavior | Median path taken by users, median orientation for each point along the path, Assets in View, CPU utilization, GPU utilization | Reduce Level-of-detail of high fidelity objects that are less frequently viewed, improve Level-of-detail of objects that are more frequently viewed if GPU/CPU utilization has room for significant increase |
| Improve locomotion in the experience, for example, reduce or increase phenomena that cause the user to develop high linear or angular velocity | Large changes in translational movement (x,y,z), large changes in angular movement (qw,qx,qy,qz) | Modify assets or game phenomena (Ex, Non Playing characters – NPC) to reduce user requirement for translational or rotational movement |

FIG. 20

METRIC-DRIVEN IMPROVEMENTS OF VIRTUAL REALITY EXPERIENCES

FIELD OF INVENTION

Embodiments of the present disclosure relate to improving virtual reality gaming experiences, such as modifying game difficulty, managing motion sickness, and performing home automation, based on data relating to gameplay by users.

BACKGROUND

Virtual Reality (VR) experiences are being used in several walks of life such as in gaming, education, and manufacturing, to name a few. The experiences range from low to most immersive experiences that aim to give the user the feel of a real-world environment.

Virtual reality is also an experimental medium in its infancy compared to many other technologies and has ample room to grow and address the current needs. For example, storytelling using this medium is still in its nascence. Antoine Ribordy explains beautifully how VR differs as a medium from regular storytelling. Ribordy says that "[i]n VR storytelling, the environment takes a central stage. You've got to pay special attention to it. In fact, the whole experience is an act of balancing story and environment to provide the answers the player is looking for."

Players or observers in a VR experience (whether together or separately in time) see different assets based on their viewpoint. The content creator, in order to build viewer engagement, must observe the patterns of viewer behavior to determine whether his/her intended design matches viewers' observations and actions. A well-designed experience is one that the viewer spends time in, and feels engaged in, ultimately delighting in the experience and perhaps revisiting it often.

In order to understand the impact of different decisions in VR and determine how their designed experience is perceived by the users, the content developer may use his/her judgment, conduct focus groups, or collect feedback from users through informal means, such as via chat groups, Discord, user surveys, or directly in the gaming application. These method of obtaining user feedback have several problems.

One such problem is delayed feedback from users. This may be due to use of older methods, such as emails, chats, or surveys, to determine user experience. Many users may not provide feedback at all since such methods of gathering user feedback are not convenient for users and require the user to actively spend time on other platforms outside the game in order to send feedback to the game developers.

Another such problem with these feedback methods is that the feedback may be inaccurate. When users are not immersed in the VR experience, they may forget what occurred step by step during the VR game, or only remember certain instances, and the feedback may be much harder to match to an exact timestamp in the virtual game.

On the other hand, if the feedback method queries the user during a VR game, such queries may be annoying to the users, as they are more interested in immersing themselves in the game and such queries may have the same effect as pop-up commercials during a game, which are usually ignored. Even if the users provide feedback to the system when queried during the game, their feedback may be limited as they would rather quickly jump back into the game instead of responding to queries.

Some VR experiences display certain assets and the user is required to interact with the assets to score in the game. In such experiences, the VR experience creator may want to know how the user interacted with the designed assets. However, as mentioned above, the methods currently used to obtain such feedback are not effective and result in inaccurate, incomplete, or delayed feedback. As such, the VR experience developers may not know exactly why a user did not interact with designed assets in the VR experience or why the user did interact with the assets in the manner that they did.

Finally, motion sickness is a major concern when users are playing virtual games, especially in games where there is a lot of motion either in the virtual world or in games that require motion in the real world from the user wearing the headset. Since feedback means are lacking, gathering accurate, complete, and granular data has become a challenge. As such, the game developers are not able to fully address motion sickness problems or determine why and how a user may become motion sick at specific timestamps of the game.

Thus, there is a need for better systems and methods for obtaining user feedback relating to users' virtual experiences in a virtual environment so as to be able to use the data to enhance their experiences.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 10 is a block diagram of examples of comparing current user data to median data to manage motion sickness, in accordance with some embodiments of the disclosure;

FIG. 15 is block diagram depicting the field of view of a user and the objects/assets encountered within the field of view, in accordance with some embodiments of the disclosure;

FIG. 18 is table of user navigation coordinates of the user's interactions as the user navigates from checkpoint C1 to checkpoint C2, in accordance with some embodiments of the disclosure;

FIG. 19 is table of user interaction and missed opportunities, in accordance with some embodiments of the disclosure;

FIG. 20 is table of content improvement suggestions based on a user's navigation in the extended reality experience, in accordance with some embodiments of the disclosure.

DETAILED DESCRIPTION

Figure 1:
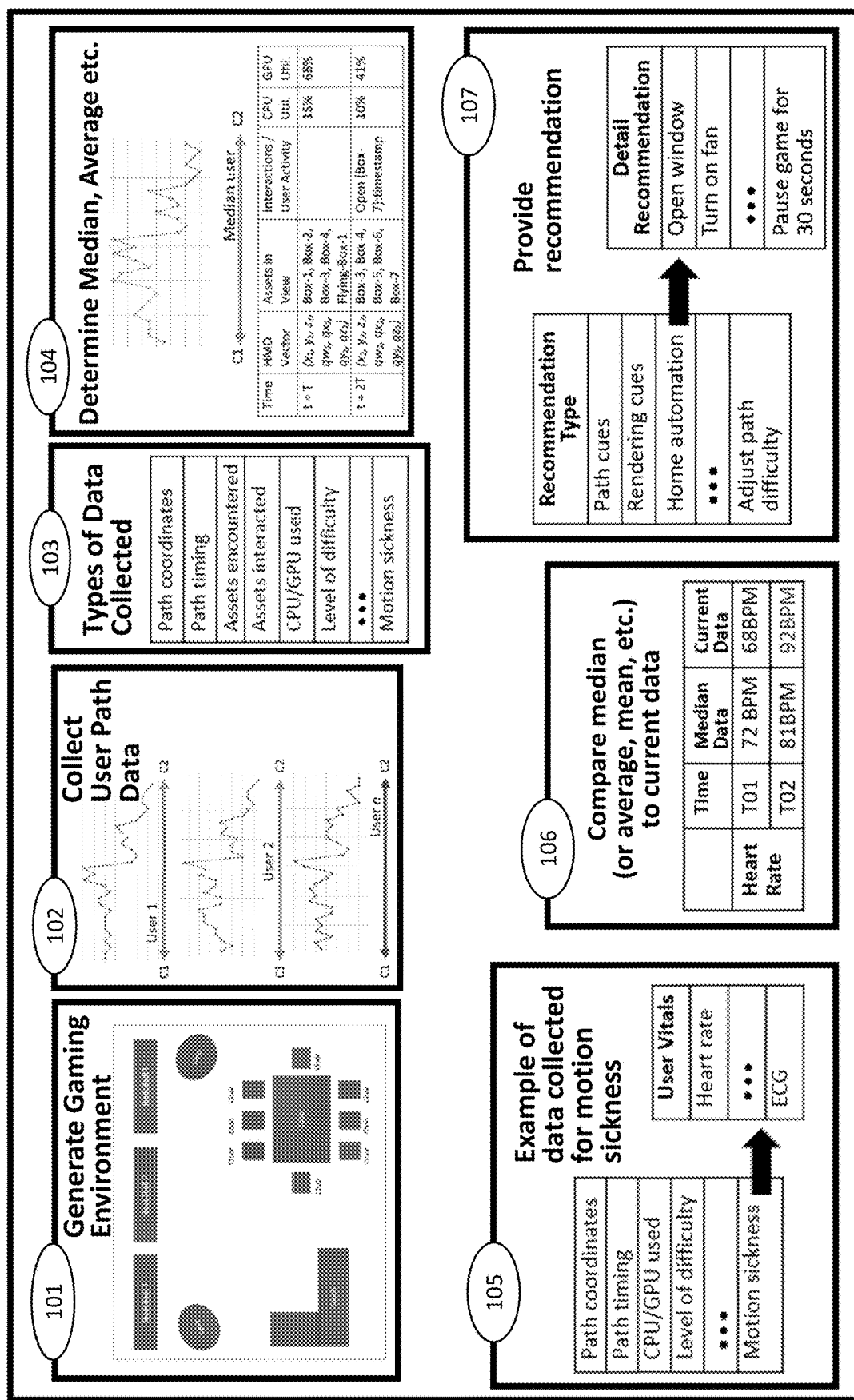
FIG. 1 is a block diagram of a process for improving a virtual reality gaming experience by collecting game data and using it to execute actions or provide recommendations, in accordance with some embodiments of the disclosure.

In accordance with some embodiments disclosed herein, some of the above-mentioned limitations are overcome by obtaining user metrics during an extended reality experience, such as a virtual game, from a plurality of users to generate median data and comparing the median data with a current user's current data to determine whether the current user is or will be experiencing similar outcomes in the extended reality experience. Some of the above-mentioned limitations are also overcome by determining starting and ending checkpoints for monitoring a current user and, in response to the user navigation data collected between the starting and ending checkpoints, providing remedial actions. For example, such remedial actions include managing motion sickness, managing game difficulty levels and adjusting difficulty as needed, blocking a path in the virtual game that is deemed to be difficult, and performing home automation to manage the user's motion sickness, all based on the path taken by the user between the starting and ending checkpoints.

In one embodiment, an extended reality experience is depicted to a plurality of users. The extended reality experience may be a virtual reality game working with reality education, an augmented reality skill-learning tool, or any other extended reality experience. An virtual reality game is used for explaining the processes and embodiments herein however the extended reality experience may be any other extended reality experiences as well.

In some embodiments, a plurality of checkpoints C1 and C2 are determined. The checkpoints are determined based on the type of extended reality experience used. In one embodiment, in an experience where a slow game for kids is involved, data gathering at every millisecond is not needed, and, as such, checkpoints C1 and C2 that are farther apart in time may be selected. In other embodiments, in a fast-paced game, such as a fight between multiple players or a car racing game, where each turn or every millisecond can affect the outcome of the game, then checkpoints C1 and C2 that are closer in time may be selected to gather more data than with the slower-moving game.

In one embodiment, once the checkpoints are selected, data of each of the plurality of users as they navigate from checkpoint 1 to checkpoint 2 is monitored and logged. Such data may include the path taken by each of the polarity of users, the amount of time spent on the path, challenges and obstacles overcome by a user along the path, the field of view of the user's headset as they navigate from checkpoint 1 to checkpoint 2, the assets with which the user has interacted along the path and how long the interaction was, the CPU/GPU usage along the path, and motion sickness data of the user along the path.

Once the data from the plurality of users is collected and logged, a median is calculated. Although median data is described, the embodiments are not so limited and an average, mean, standard deviation, variance, or some other calculation based on an equation, or another statistical measure may also be used. The calculated data may also be referred to herein as performance metric. The median is then used to compare the current data of a current user that is currently navigating the same path in the extended reality experience. The comparison allows the system to make enhancements and changes to the extended reality experience. It also allows the system to predict motion sickness or manage it once it occurs through home automation techniques. The comparison also allows the system to make adjustments to the game difficulty levels, such as increasing or decreasing difficulty, for a better user experience.

FIG. 1 is a block diagram of a process for improving a VR gaming experience by collecting game data and using it to execute actions or provide recommendations, in accordance with some embodiments of the disclosure.

In some embodiments, at block 101, a gaming environment is displayed on a display device. The gaming environment may be an extended reality environment, which includes virtual reality, augmented reality, mixed reality, or any other virtual type of reality, including in the metaverse.

Figure 4:
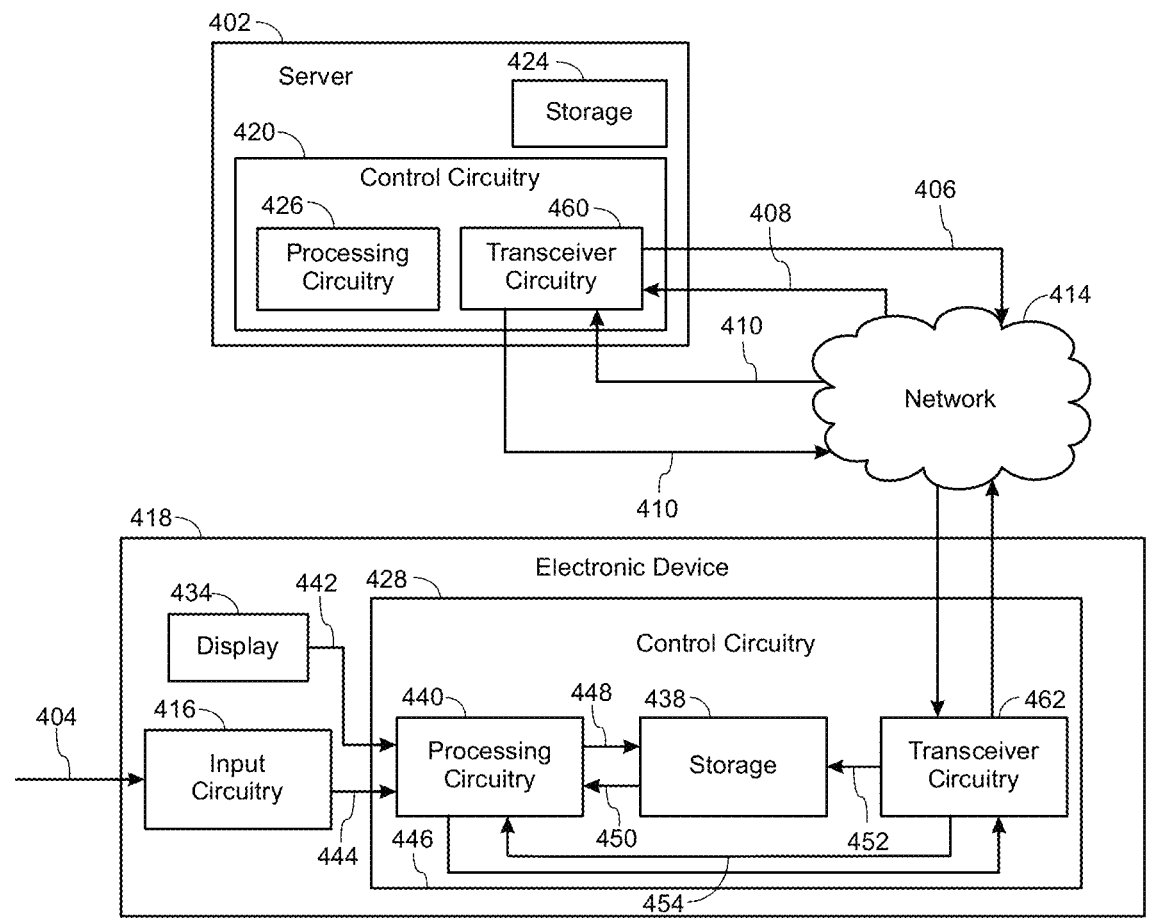
FIG. 4 is a block diagram of an example system for improving virtual reality gaming experiences, in accordance with some embodiments of the disclosure.
Figure 5:
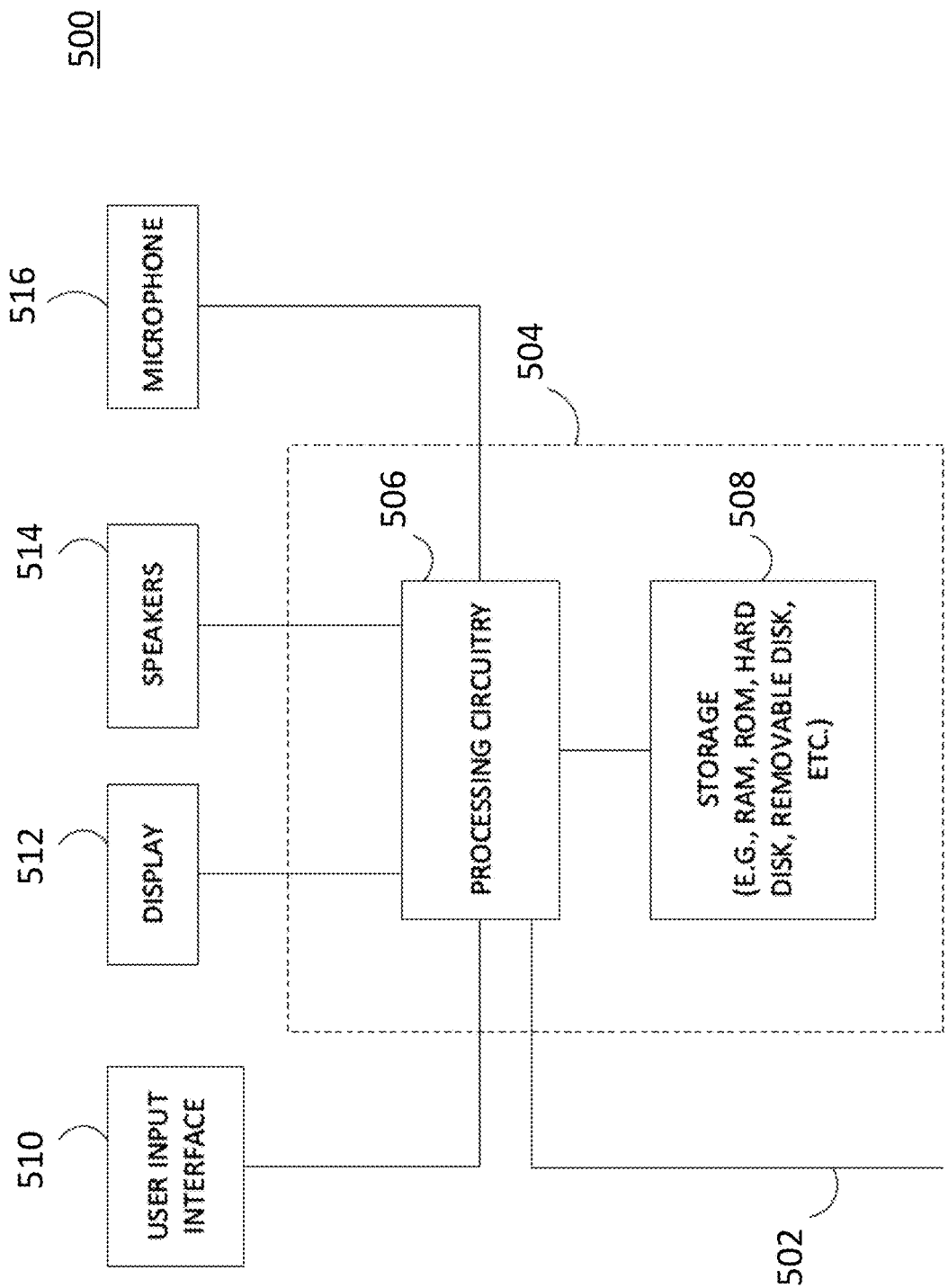
FIG. 5 is a block diagram of an electronic device used in a gaming environment, in accordance with some embodiments of the disclosure.

In some embodiments, the systems described herein, such as the system in FIGS. 4 and 5, provide an extended reality environment that includes virtual simulations of both real-world experiences and other experiences that are fictional. For example, the systems may simulate a virtual layout of a certain city, such as San Francisco or Paris, and allow the user to perform activities in the virtually simulated environment, such as walking through the streets of San Francisco or playing a game of car racing through the streets of Paris.

In other examples, virtual environments that are fictional, like outer space or some other imaginative environment, may be created.

In some embodiments, these systems utilize an extended reality device, such as a VR headset, VR glasses, or a mobile phone that can act as a VR device. The extended reality device may include a display screen for displaying the simulated virtual environment. The extended reality device may be worn on the user's head such that the display of the extended reality device is in front of the user's eyes, allowing the user to view the extended reality 3D simulated environment depicted on the display of the extended reality device. In some embodiment, when references are made to navigation along a path, the references are associated with virtual reality device, such as a virtual reality headset or glasses. In other embodiments, when references are made to augmented reality embodiments where real world view is used, the references are associated with augmented reality device, such as an augmented reality headset or glasses through which a real world environment, as well as virtual overlays on the real world environment, can be visualized via the headset or glasses.

In some embodiments, the extended reality device may also include any one or more of a camera that is facing inward to track the user's gaze, speakers for sound effects, and motion producing components, such as vibration modules to give the user a sense of feeling effects displayed in the virtual world, such as an earthquake, etc. It may also include accelerometers, gyroscopes, and proximity sensors. It may include a processor, such as a system on a chip (SoC), and memory.

The extended reality device may be able to connect to the internet and download or access a variety of applications that provide extended reality experiences to the user, such as a game, a factory setting, a medical operation, training to drive a vehicle, exercising, etc. In some embodiments, the extended reality device may include more than one connectivity option to communicate with other devices, body sensors, or electronic devices for downloading applications, and such connectivity options may include connection via an API, connection using a SoC that features Wi-Fi, Bluetooth, and/or other radio frequency connectivity, in addition to an available USB connection (e.g., USB Type-C).

As mentioned above, the extended reality device may connect to the internet for downloading gaming or other types of applications. These applications may include assets within the virtual world that can move in three-dimensional (3D) space, e.g., in three translational x, y, z axes and three rotational axes, which is commonly referred to as six degrees of freedom (6DOF).

In some embodiments, using the extended reality device, the systems create a visual for each eye of the user that allows the user to play a virtual game. In some instances, either an avatar of a portion of the user's body, their whole body represented as an avatar, or no avatar may be used during the virtual game. When an avatar is used, the systems create an illusion that the user is truly in the virtual environment being displayed.

In some embodiments, the extended reality devices (such as headsets, either augmented reality, virtual reality, or headsets with dual functionality, or virtual glasses, etc.) use head tracking technology to track the movement of the user's head while they are wearing the device on their head. Such tracking captures the user's head movement as the means of manipulating the camera and viewing things in the virtual world. For example, if the user orients their head to the left, then objects or assets that should be on the left side appear to the user. As such, the visuals change for the user according to how they orient their head, i.e., the extended reality headset.

In some embodiments, in addition, some extended reality headsets, attachments and accessories that are directly attached to the headset or associated and paired with the headset include gaming controllers that can act as hands for the purposes of interaction in the virtual game. The user may be able to use such controllers and perform functions inside the virtual environment. For example, the user may be able to drive a car, hit another avatar, displace an object, execute a golf swing, etc.

In addition to controllers, in some embodiments, systems may also include wearable devices that can be worn on the body of the user to provide a full body VR experience. For example, the embodiments may include combining the extended reality headset with sensors placed on the body of the user to simulate and mimic all body movements performed in the real word as movements on an avatar of the body used in the virtual world.

In some embodiments, the extended reality environment provided may be stationary, and in other embodiments, the extended reality environment provided may be dynamically changing, or require a user to navigate from one location to another. For example, the user may be required to navigate from one virtual room in the extended reality environment to another room or drive from one location in the extended reality environment to another location.

In a stationary extended reality environment, in some embodiments, the user may be able to look around using their extended reality headset without having to move within the virtual world. For example, stationary experiences may include sitting in a virtual ride, or playing a chess game, which may entail only the limited movement of a sit-and-watch experience.

In some embodiments, other experiences may require the user to perform several movements or transition from one place to another. For example, a user may need to look all around 360° to defend from getting hit in a virtual environment where things are thrown at the user from all directions. In such situations, head-tracking is critical and needs to be performed in real time to reduce any lag between the user movements in the real world and the images that should be relayed to the user in the virtual world based on the real-world movements. For example, if the user quickly spins 180° to fight a virtual animal jumping at him or her from behind, then the images in the virtual world should quickly, with minimal lag, display the animal in motion jumping on the user to provide a real-world-like effect. As such, such dynamically moving experiences are more immersive and require tracking of the headset movements with a higher precision.

Following user movements and matching them with the virtual imagery with minimal lag is also important in reducing motion sickness among users. This is because when the brain senses movement by getting signals from the inner ears, eyes, muscles, and joints and the movements are not accompanied with visual imagery matching the movements, among other factors, this may trigger motion sickness.

Referring back to block 101, in some embodiments, an extended reality environment of a room may be displayed. As depicted in block 101, the exemplary virtual room includes a plurality of bookshelves, chairs, tables, lamps, and a couch to simulate a real room setting. The VR game may provide a challenge to the user to score points or elevate to the next level of the game, which may include a room with a higher level of challenge. The challenge may require the user to uncover a hidden object, or rearrange the layout of the room, or it may be a game in which the user is chasing an avatar to catch them as they run from room to room.

At block 102, in some embodiments, a portion of the virtual game is selected. The portion selected may include a starting checkpoint, also referred to as checkpoint 1 or "C1" and an ending checkpoint, also referred to as checkpoint 2 or "C2." A checkpoint, in some embodiments, is an experience or a portion of the game state that is saved for rollback or restart. Typically, a checkpoint is before something new may unfold in an experience or game. For example, in a game that has multiple levels, there is typically a checkpoint after each level is crossed. If a character dies in a game, it will respawn from the previous checkpoint.

Data between the checkpoints may be collected by the system of FIG. 1 and used to provide an enhanced extended reality experience. For example, since there may be a plurality of tasks and challenges between the checkpoints, data relating to the time taken to complete the set of tasks or sequence of tasks or challenges may present the total time spent between checkpoints C1 and C2. When a user reaches checkpoint C2, a timestamped entry is made to indicate the achievement. When a user exits the experience before reaching checkpoint C2, the absence of this entry in the log file indicates that the user did not complete the tasks to reach checkpoint C2. Aggregation of such data between the checkpoints helps the user as well as the programmer evaluate and adjust the virtual game for an enhanced experience.

Figure 2:
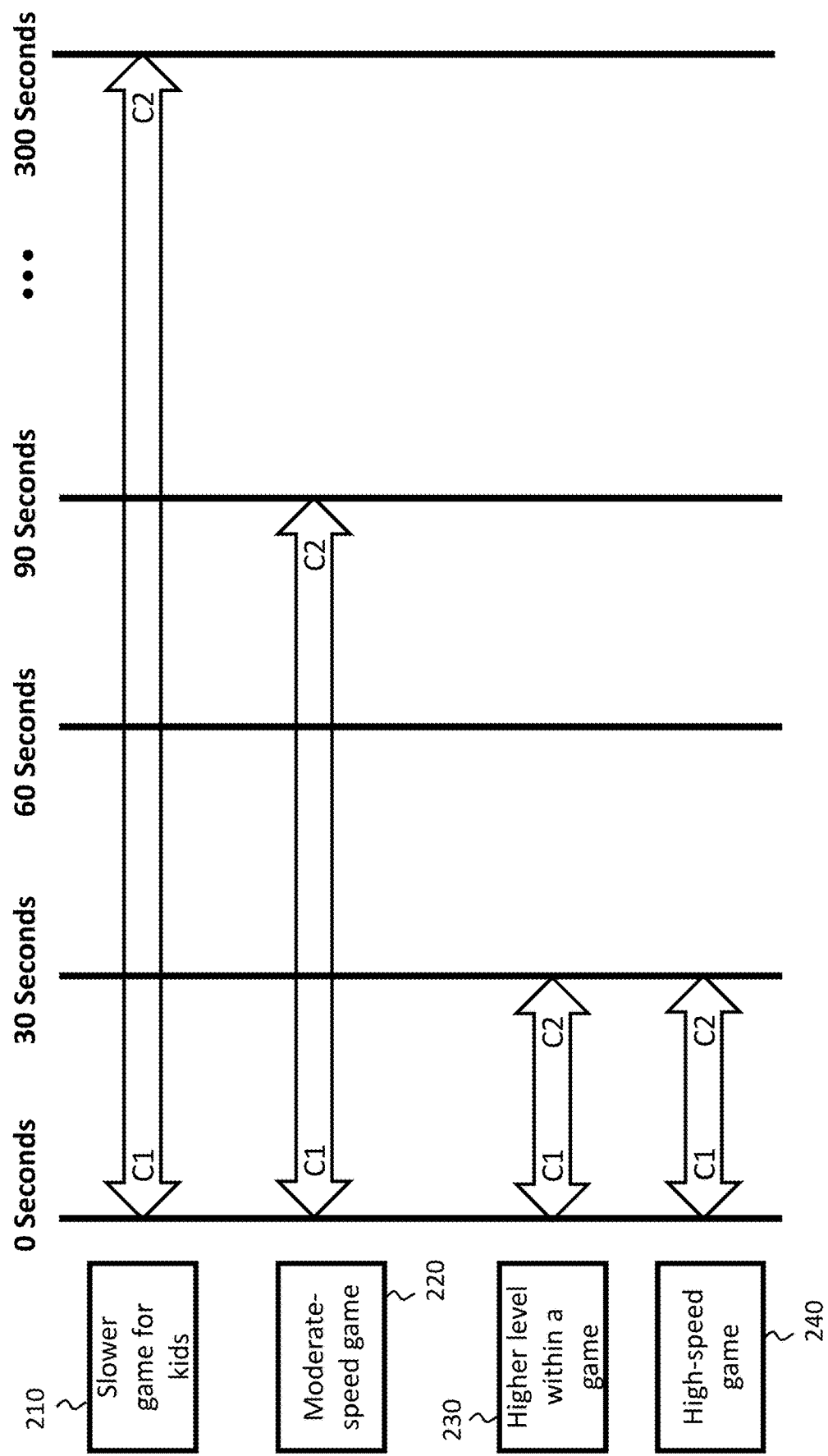
FIG. 2 is a block diagram depicting a selection of checkpoints based on the type of virtual game, in accordance with some embodiments of the disclosure.

In some embodiments, the checkpoints are selected based on the type of extended reality game and its environment. As depicted in FIG. 2 at block 210, in one embodiment, the extended reality game may be a slow game for kids. The game may not have fast-moving components or rapidly changing graphics. It may not have as many assets. It may not allow as many degrees of rotation since it does not have imagery to show for each orientation of the user's headset. For example, the extended reality game may be a simple game, like tic-tac-toe or an educational game requiring the child to identify shapes, etc.

In this embodiment, gathering data at a shorter interval may not be necessary. This is because in a slower-moving game you may be able to skip frames and gather data at longer intervals without missing critical components of the game. As such, a starting checkpoint C1 and an ending checkpoint C2 may be selected at 300 seconds apart, and data may be captured at 15- or 30-second intervals within the total time of 300 seconds.

As depicted in FIG. 2 at block 220, in one embodiment, the extended reality game may be a moderate-speed virtual game. The game may have moderately fast-moving components that require rendering at one- or two-second intervals. It may have more assets than the slower-moving game. It may also allow more degrees of rotation and at each rotation have imagery in the virtual world to match the headset movement. For example, the extended reality game may be a game like playing tennis, chess, or walking through a maze. Since games like tennis depict the same tennis court and tracking of the tennis ball as it is hit from side to side, the pace of rendering the imagery in the virtual world may be moderate, tracking the tennis ball at certain intervals, such as every one to two seconds.

In this embodiment, gathering data at shorter intervals may be required to keep track of where the tennis ball is located after each shot. As such, a starting checkpoint C1 and an ending checkpoint C2 may be selected at 90 seconds apart, and data may be captured at every one- to two-second intervals within the total time of 90 seconds.

As depicted in FIG. 2 at blocks 230 and 240, in one embodiment, the extended reality game may be at a fast pace game or may be a game that is at a level that requires faster responses. The game may have fast-moving objects or rapidly changing graphics. It may have several objects/assets, such as a car case game depicting seven other cars moving at different speeds in the field of vision and several obstacle on the path. It may also allow all degrees of rotation and have rapidly changing imagery to show for each orientation of the user's headset. For example, the extended reality game may be a fast car race, a game of fighter jets chasing each other through the mountains, a fast roller coaster, or a shooting game where several opponents are attacking at the same time.

In this embodiment, gathering data at very much shorter intervals may be necessary. This is because in a fast-moving game you may not be able to skip frames without missing critical pieces of the game, such as a fighter jet crashing into the mountain if a proper maneuver is not performed or a user getting hit by a bullet in the game where the user is being attacked from all angles. As such, a starting checkpoint C1 and an ending checkpoint C2 may be selected at 30 seconds apart and data may be captured at every ½ or $\frac{1}{5}^{th}$ of a second.

Although certain time intervals have been described above in relation to blocks 210 to 240, the embodiments are not so limited, and other starting and ending checkpoints as well as data-gathering intervals within the checkpoints are also contemplated.

Figure 3:
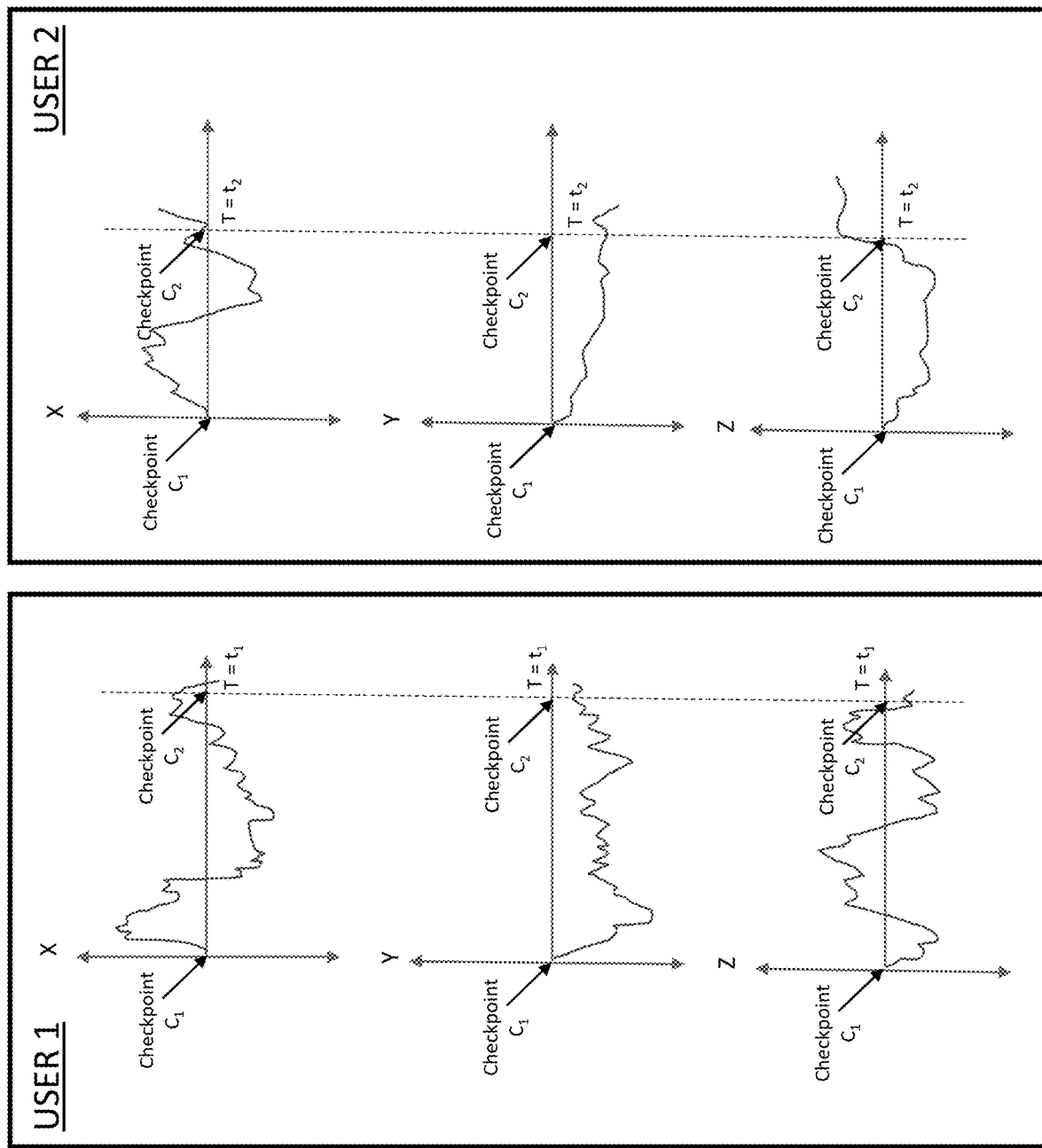
FIG. 3 is a block diagram of data collected from a plurality of users as they navigate through checkpoints in a virtual game, in accordance with some embodiments of the disclosure.

Referring back to block 102, once the starting and ending checkpoints have been identified, the system may collect data from a plurality of users that have played the game and navigated from the starting checkpoint C1 to the ending checkpoint C2. One example of such data in a graphical format is depicted in FIG. 3. Although a graphical chart is used as an example, the data may be in any other format, such as a table, etc. As depicted in FIG. 3, two users, User 1 and User 2, have navigated from the starting checkpoint C1 to the ending checkpoint C2. Their data was captured in all 6DOF (only 3DOF are shown). The data is captured between time $T=t_0$ to time $T=t_1$. As it can be seen, the path navigated by User 1 is different from the path navigated by User 2. The path and other data from User 1 and User 2 can be used to calculate a median path, such as the median path depicted in FIG. 14.

The data collected relates to different experiences encountered by different users, from the plurality of users. For example, different users spend different amounts of time between the two checkpoints and encounter different challenges, e.g., one user may select an easier path than another, one user may lose a life while the other may pass through without losing a life.

Different users may also have different experiences in discovering assets in the game. Some users may discover key assets to clear a level more quickly than others or in fewer attempts. Some users may enjoy an experience more, choosing to stay in it for longer in order to explore their surroundings. All such user experiences, and their data, may be captured while the user navigates from starting checkpoint C1 to ending checkpoint C2. As depicted in block 102, three users, User 1, User 2, and User 3, were monitored by the system as they navigated through the checkpoints C1 to C2.

User engagement and interaction in an experience depend on a multitude of factors. The aggregate user behavior measured as time spent between the two checkpoints and the proportion of sessions where the user exits without reaching the next checkpoint may be considered high-level indicators. The methods and systems to log and analyze user behavior using the metrics described shall offer the content creator deep insight on how to improve engagement. Examples of such data relating to behavior are further described at block 103.

Block 103 depicts some examples of types of data that may be collected while the plurality of users navigate through the checkpoints C1 and C2. As described earlier, the intervals at which the data is collected may differ based on the type of application, e.g., slow-, moderate-, or fast-paced virtual game.

Figure 6:
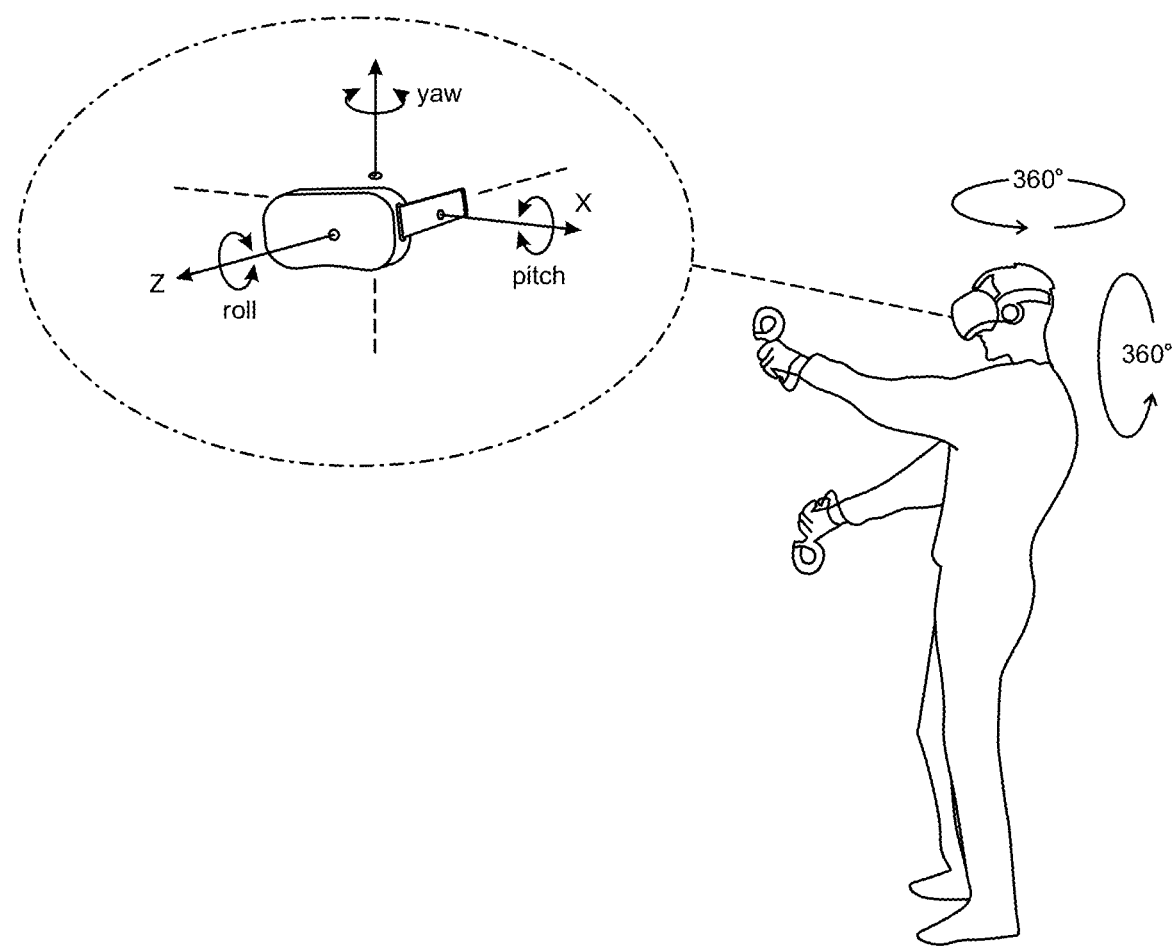
FIG. 6 is a block diagram of an extended reality headset used in a gaming environment, in accordance with some embodiments of the disclosure.

In one embodiment, data relating to path coordinates may be collected as the plurality of users navigate through the checkpoints C1 and C2. The path coordinates may be x, y, z coordinates as well as the pitch, roll, and yaw orientations as depicted in FIG. 6. In this embodiment, the system may at predetermined intervals collect each movement along the path selected by the user including all the coordinates related to a reference frame. For example, the reference frame may be a located in the virtual world, such as an origin at an object in the virtual world, or it may be the origin of the headset prior to the starting of the game.

In another embodiment, data relating to path timing may be collected as the plurality of users navigate through the checkpoints C1 and C2. The path timing may indicate the amount of time a user has taken to go from checkpoint C1 to checkpoint C2 along a path the user has selected. In this embodiment, the system may at a predetermined interval collect data relating to the amount of time taken by the user to pass through several locations that are along the path selected. For example, if the path is to go from the couch to the farther lamp in block 101, the system may determine the total amount of time taken from the couch to the farther lamp as well as the amount of time for interim points, such as from couch to chair and then from chair to farther lamp, if that is the path selected by the user.

In another embodiment, data relating to assets encountered may be collected as the plurality of users navigate through the checkpoints C1 and C2. The assets encountered along the path may be determined by determining which path the user selected and what is in the field of view of the user as they navigate on that path. In this embodiment, the system may at a predetermined interval collect data relating to the field of view of the user as the user navigates along the path. For example, if the path selected is to walk on the left side of the room to the closest lamp, and the user faces straight towards the lamp, then the system may determine that the only asset encountered and in the field of view is the closest lamp, since the user has not turned their headset to the right to view the chairs and the table.

In another embodiment, data relating to assets interacted with may be collected as the plurality of users navigate through the checkpoints C1 and C2. The assets interacted with along the path may be determined by monitoring the user's actions in the virtual game as the user navigates along their path. For example, although the user may encounter certain assets in their view, the user may not have interacted with those assets and may simply have walked past them. One example of interaction may be to move the chair, sit on the chair, stumble over the chair or place something on the chair. The system may at a predetermined interval collect data relating to assets in the field of view to determine if the user has interacted with them, and if so, it may record the type of interaction.

In another embodiment, data relating to CPU and GPU usage may be collected as the plurality of users navigate through the checkpoints C1 and C2. Since user headset movement requires rendering and re-rendering of the images in the virtual world, the amount of movement, the pace of the movement, and the amount of rendering required based on the images and amount of detail depicted use up CPU and GPU memory. The system may at a predetermined interval collect data relating to the amount of CPU and GPU used based on the path taken by the user and the amount and quality of rendering and re-rendering performed. Such data may be used to manage CPU and GPU usage, and also to predict usage and perform resource management for future users.

In yet another embodiment, data relating to level of difficulty may be collected as the plurality of users navigate through the checkpoints C1 and C2. The level of difficulty experienced in going from C1 to C2 and all the interim points may be collected at predetermined intervals. For example, a programmer may have programmed a certain level of difficulty at each interim point between C1 and C2 preventing the user from easily clearing the game level. The system monitors the user's path and navigation to determine if the user experienced the same level of difficulty, or within the threshold of the programmed difficulty, while navigating from C1 to C2 and the interim points. For example, some users may encounter a higher level of difficulty while other users may be able to clear certain levels with more ease and speed.

In another embodiment, data relating to motion sickness may be collected as the plurality of users navigate through the checkpoints C1 and C2. Since user headset movement or visual effects depicted in the virtual game, such as a virtual roller coaster ride, may cause nausea and motion sickness, the system monitors the plurality of users as they navigate through the checkpoints C1 and C2 and collects data such as heartbeat, blood pressure, EKG and more from sensors and other wearables attached to the body of the user. The system collects such data when certain fast-paced twists and turns occur in the game or when graphics are rendered at a fast pace. It may also collect such data at a predetermined interval. Such data may be used to manage motion sickness by providing suggestions to the user or the programmer on remedial steps.

At block 104, a median path based on the path taken by the plurality of users may be calculated. Although median path is described, the embodiments are not so limited and an average, mean, standard deviation, variance, or some other calculation based on an equation, or another statistical measure to determine a path may also be used. Medians of other data, outside of path data, collected may also be calculated. The median may represent an average user from the plurality of users. As depicted, a median user's graph is presented at block 104, along with a table of some median data for some of the types of data described in block 103. Although a few of types of data collected have been described in blocks 103 and 104, the embodiments are not so limited, and other types of data are also contemplated. For example, data such as how a user reacted once they encountered their first difficulty, or data relating to which assets were visited most often, or the amount of time spent interacting with certain assets, may also be collected.

At block 105, an example of one type of data collected, including a plurality of subcategories of data collected, is depicted. In this embodiment, motion sickness data is one of the types of data that is being collected. When collecting subcategories of data relating to motion sickness data, the system may access a plurality of devices and sensors attached to the user's body, associated with the wearables worn by the user, or devices that remotely monitor the user. For example, devices such as heart rate monitor, blood pressure monitor, blood sugar level monitor, ECG, and EKG may be accessed by the system to obtain a reading of the user's vitals as the user navigates from one point to the next along a path between the checkpoints C1 and C2. As described above, this data may be collected for a plurality of users that have played the game and navigated between the checkpoints.

At block 106, The system may obtain current data from the current user as the user starts playing the game and navigates from checkpoint C1 to checkpoint C2. The monitoring may be in real time and may be performed at predetermined intervals at interim locations between checkpoints C1 and C2. The current data obtained from the current user may be compared with the median data.

As depicted, the median data indicates that at time T01 a median user's heart rate was 72 BPM while the current user's heart rate is 68 BPM. The median data further indicates that as a median user navigated from one point along their path in the game to the next point, i.e., from time T01 to time T02, their heart rate increased from 72 BPM to 81 BPM. Although median data is mentioned, other types of data based on computing an average, mean, standard deviation, variation, or some other formula can also be used. The current data captured for the same time intervals indicates that the current user's heart rate while navigating from T01 to time T02 jumped from 68 BPM to 92 BPM.

In one embodiment, the rise in heart rate for the current user from 68 PPM to 92 BPM maybe outside a safety threshold range. Such threshold ranges may be predetermined by the system or obtained based on medical advice for the specific user or generally for anyone playing the virtual game.

At block 107, determining that there's a cause for a concern for the rapid rise in BPM of the current user, the system may provide a recommendation to the user. Some examples of the recommendation include opening a window, turning on a fan, or pausing the game for 30 seconds. In another embodiment, instead of providing a recommendation to the user, the system may, for example, automatically turn on a fan in the room where the user is currently playing the game. The system may do so by accessing the fan via an API.

Although motion sickness was used as an example of the type of data collected and the remedial steps taken thereafter to manage the motion sickness, the embodiments are not so limited. For example, data collected may be for any type, including some of the data types of examples described in block 103, and the collected data may be compared to a current user's current data. Upon comparison, the system may determine whether the current data is within a threshold of the data collected for the median user and if not, remedial actions may be taken.

In addition to the above, both translational and rotation data based on the user's movements while wearing the extended reality headset may be collected. In one example, different users may have different rotation vector graphs in the experience. Such vector graphs may be determined using a general tree based on the user navigation between checkpoints C1 and C2. The difference between two successive records may represent a state change in the position of the user in the 6DOF experience. Additional details on the tree generated and vector graphs are described in relation to FIG. 13.

FIG. 4 is a block diagram of an example system for improving virtual reality gaming experiences, in accordance with some embodiments of the disclosure and FIG. 5 is a block diagram of an electronic device used in a gaming environment, in accordance with some embodiments of the disclosure. FIGS. 4 and 5 also describe exemplary devices, systems, servers, and related hardware that may be used to implement processes, functions, and functionalities described in relation to FIGS. 1-3, and 6-21. Further, FIGS. 4 and 5 may also be used to display an extend reality experience, set difficulty levels in an extended reality experience, to obtain user metrics during an extended reality experience, such as a virtual game, from a plurality of users to generate median data, compare median data with a current user's current data to determine whether the current user is or will be experiencing similar outcomes in the extended reality experience, determine starting and ending checkpoints for monitoring a current user, provide remedial actions based on user or plurality of user performance, manage difficulty levels and adjust as needed based on user interactions, manage motion sickness, perform home automation functions, and execute artificial intelligence or machine learning algorithms to manage difficulty levels, motion sickness, or home automation.

In some embodiments, one or more parts of, or the entirety of system 400, may be configured as a system implementing various features, processes, functionalities and components of FIGS. 1-3, and 6-21. Although FIG. 4 shows a certain number of components, in various examples, system 400 may include fewer than the illustrated number of components and/or multiples of one or more of the illustrated number of components.

System 400 is shown to include a computing device 418, a server 402 and a communication network 414. It is understood that while a single instance of a component may be shown and described relative to FIG. 4, additional instances of the component may be employed. For example, server 402 may include, or may be incorporated in, more than one server. Similarly, communication network 414 may include, or may be incorporated in, more than one communication network. Server 402 is shown communicatively coupled to computing device 418 through communication network 414. While not shown in FIG. 4, server 402 may be directly communicatively coupled to computing device 418, for example, in a system absent or bypassing communication network 414.

Communication network 414 may comprise one or more network systems, such as, without limitation, an internet, LAN, WIFI or other network systems suitable for audio processing applications. In some embodiments, system 400 excludes server 402, and functionality that would otherwise be implemented by server 402 is instead implemented by other components of system 400, such as one or more components of communication network 414. In still other embodiments, server 402 works in conjunction with one or more components of communication network 414 to implement certain functionality described herein in a distributed or cooperative manner. Similarly, in some embodiments, system 400 excludes computing device 418, and functionality that would otherwise be implemented by computing device 418 is instead implemented by other components of system 400, such as one or more components of communication network 414 or server 402 or a combination. In still other embodiments, computing device 418 works in conjunction with one or more components of communication network 414 or server 402 to implement certain functionality described herein in a distributed or cooperative manner.

Computing device 418 includes control circuitry 428, display 434 and input circuitry 416. Control circuitry 428 in turn includes transceiver circuitry 462, storage 438 and processing circuitry 440. In some embodiments, computing device 418 or control circuitry 428 may be configured as media device 500 of FIG. 5.

Figure 8:
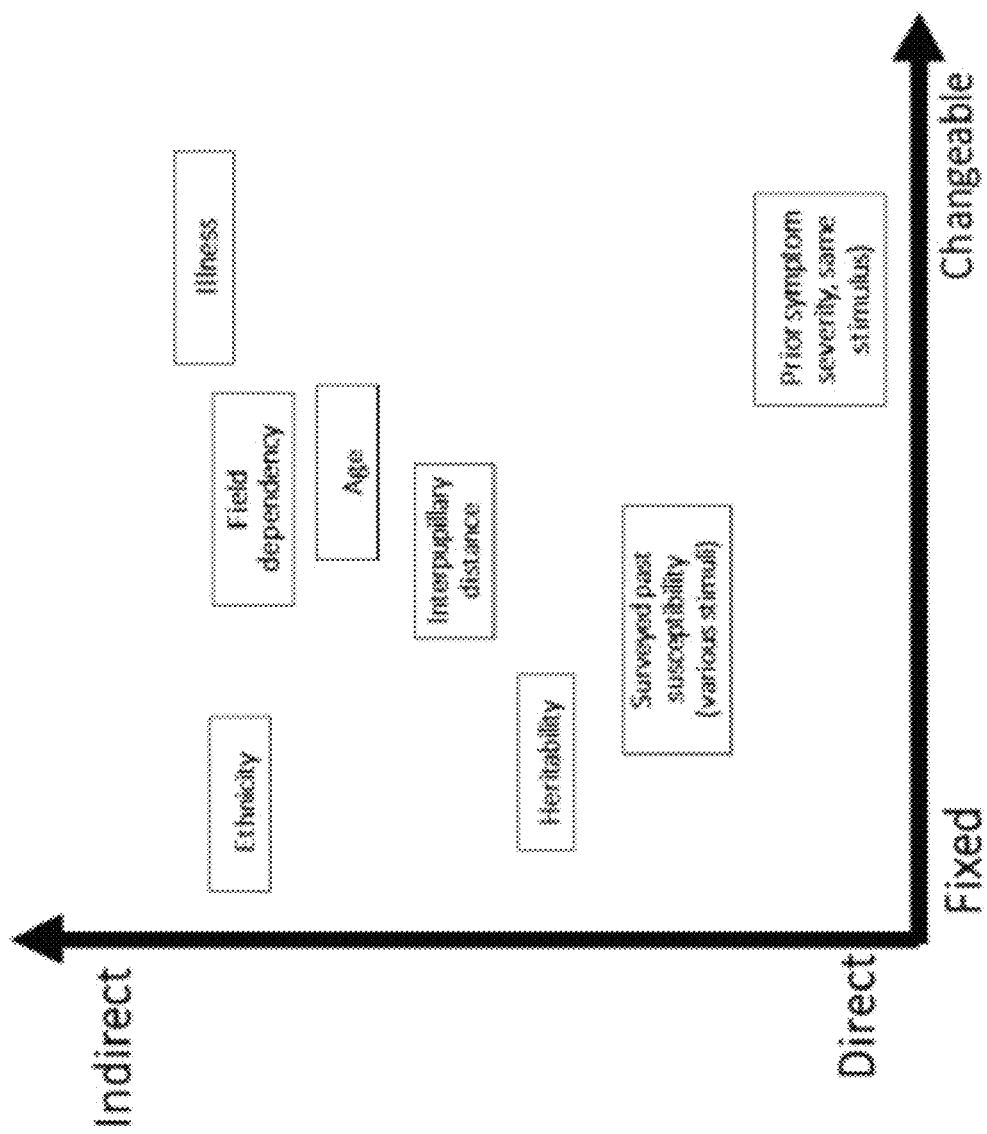
FIG. 8 is an example of a chart that depicts various user background factors that can be taken into account for determining motion sickness relating to playing of the virtual game, in accordance with some embodiments of the disclosure.

Server 402 includes control circuitry 420 and storage 424. Each of storages 424 and 438 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 424, 438 may be used to store various types of content, metadata, and or other types of data (e.g., they can be used to store user statistics or group statistics as depicted in FIG. 8, difficult level values, user and plurality of user performance data or user performance metric, starting and endings of checkpoints, data relating to home automation devices and their settings and any user preferences, lists of recommendations and remedial actions, and ML, and AI algorithms). Non-volatile memory may also be used (e.g., to launch a boot-up routine and other instructions). Cloud-based storage may be used to supplement storages 424, 438 or instead of storages 424, 438. In some embodiments, data relating to displaying an extend reality experience, setting difficulty levels in an extended reality experience, to obtaining user metrics during an extended reality experience, such as a virtual game, from a plurality of users to generate median data, comparing median data with a current user's current data to determine whether the current user is or will be experiencing similar outcomes in the extended reality experience, determining starting and ending checkpoints for monitoring a current user, providing remedial actions based on user or plurality of user performance, managing difficulty levels and adjusting as needed based on user interactions, managing motion sickness, performing home automation functions, and executing artificial intelligence or machine learning algorithms to manage difficulty levels, motion sickness, or home automation, and data relating to all other processes and features described herein, may be recorded and stored in one or more of storages 412, 438.

In some embodiments, control circuitry 420 and/or 428 executes instructions for an application stored in memory (e.g., storage 424 and/or storage 438). Specifically, control circuitry 420 and/or 428 may be instructed by the application to perform the functions discussed herein. In some implementations, any action performed by control circuitry 420 and/or 428 may be based on instructions received from the application. For example, the application may be implemented as software or a set of executable instructions that may be stored in storage 424 and/or 438 and executed by control circuitry 420 and/or 428. In some embodiments, the application may be a client/server application where only a client application resides on computing device 418, and a server application resides on server 402.

The application may be implemented using any suitable architecture. For example, it may be a stand-alone application wholly implemented on computing device 418. In such an approach, instructions for the application are stored locally (e.g., in storage 438), and data for use by the application is downloaded on a periodic basis (e.g., from an out-of-band feed, from an internet resource, or using another suitable approach). Control circuitry 428 may retrieve instructions for the application from storage 438 and process the instructions to perform the functionality described herein. Based on the processed instructions, control circuitry 428 may determine a type of action to perform in response to input received from input circuitry 416 or from communication network 414. For example, in response to determining that a current user's performance exceeded the difficulty level for a portion of the game, such as a predetermined difficulty level is set in a way expecting that a user to make at least five attempts before completing the portion of the game and the current user easily beats the expectations by completing it in one attempt, then such input is used by the control circuitry 428 to perform remedial actions, such as increasing game difficulty. Other such processes are described at least in flowcharts 1, 7, 9, and 13A, 13B depicted herein.

In client/server-based embodiments, control circuitry 428 may include communication circuitry suitable for communicating with an application server (e.g., server 402) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 414). In another example of a client/server-based application, control circuitry 428 runs a web browser that interprets web pages provided by a remote server (e.g., server 402). For example, the remote server may store the instructions for the application in a storage device. The remote server may process the stored instructions using circuitry (e.g., control circuitry 428) and/or generate displays. Computing device 418 may receive the displays generated by the remote server and may display the content of the displays locally via display 434. This way, the processing of the instructions is performed remotely (e.g., by server 402) while the resulting displays, such as the display windows described elsewhere herein, are provided locally on computing device 418. Computing device 418 may receive inputs from the user via input circuitry 416 and transmit those inputs to the remote server for processing and generating the corresponding displays. Alternatively, computing device 418 may receive inputs from the user via input circuitry 416 and process and display the received inputs locally, by control circuitry 428 and display 434, respectively.

Server 402 and computing device 418 may transmit and receive content and data such as objects, frames, snippets of interest, and input from primary devices and secondary devices, such as AR devices. Control circuitry 420, 428 may send and receive commands, requests, and other suitable data through communication network 414 using transceiver circuitry 460, 462, respectively. Control circuitry 420, 428 may communicate directly with each other using transceiver circuits 460, 462, respectively, avoiding communication network 414.

It is understood that computing device 418 is not limited to the embodiments and methods shown and described herein. In nonlimiting examples, computing device 418 may be a virtual, augmented, or mixed reality headset, smart glasses, or a device that can perform function in the metaverse, a primary device, a personal computer (PC), a laptop computer, a tablet computer, a WebTV box, a personal computer television (PC/TV), a PC media server, a PC media center, a handheld computer, a mobile telephone, a smartphone, or any other device, computing equipment, or wireless device, and/or combination of the same capable of suitably displaying primary content and secondary content.

Control circuitry 420 and/or 418 may be based on any suitable processing circuitry such as processing circuitry 426 and/or 440, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores).

In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 420 and/or control circuitry 418 are configured to display an extend reality experience, set difficulty levels in an extended reality experience, to obtain user metrics during an extended reality experience, such as a virtual game, from a plurality of users to generate median data, compare median data with a current user's current data to determine whether the current user is or will be experiencing similar outcomes in the extended reality experience, determine starting and ending checkpoints for monitoring a current user, provide remedial actions based on user or plurality of user performance, manage difficulty levels and adjust as needed based on user interactions, manage motion sickness, perform home automation functions, and execute artificial intelligence or machine learning algorithms to manage difficulty levels, motion sickness, or home automation, and perform all processes described and shown in connection with flowcharts 1, 7, 9, and 13A, 13B.

User input 404 may be received from virtual, augmented or mixed reality headsets, mobile data, smart glasses. Transmission of user input 404 to computing device 418 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 416 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 440 may receive input 404 from input circuit 416. Processing circuitry 440 may convert or translate the received user input 404 that may be in the form of voice input into a microphone, or movement or gestures to digital signals. In some embodiments, input circuit 416 performs the translation to digital signals. In some embodiments, processing circuitry 440 (or processing circuitry 426, as the case may be) carries out disclosed processes and methods. For example, processing circuitry 440 or processing circuitry 426 may perform processes as described in flowcharts 1, 7, 9, and 13A, 13B and other figures described herein.

FIG. 5 shows a generalized embodiment of an electronic equipment device 500, in accordance with one embodiment. In an embodiment, the equipment device 500, is the same equipment device 402 of FIG. 4. The equipment device 500 may receive content and data via input/output (I/O) path 502. The I/O path 502 may provide audio content (e.g., broadcast programming, on-demand programming, internet content, content available over a local area network (LAN) or wide area network (WAN), and/or other content) and data to control circuitry 504, which includes processing circuitry 506 and a storage 508. The control circuitry 504 may be used to send and receive commands, requests, and other suitable data using the I/O path 502. The I/O path 502 may connect the control circuitry 504 (and specifically the processing circuitry 506) to one or more communications paths. I/O functions may be provided by one or more of these communications paths but are shown as a single path in FIG. 5 to avoid overcomplicating the drawing.

The control circuitry 504 may be based on any suitable processing circuitry such as the processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The communications between two separate user devices, such as the extended reality headset and a gaming module or the receiving server to send a message, or communications between two separate user devices, such as the sending head mounted VR device's FOV or coordinates to the server, displaying an extend reality experience, setting difficulty levels in an extended reality experience, to obtaining user metrics during an extended reality experience, such as a virtual game, from a plurality of users to generate median data, comparing median data with a current user's current data to determine whether the current user is or will be experiencing similar outcomes in the extended reality experience, determining starting and ending checkpoints for monitoring a current user, providing remedial actions based on user or plurality of user performance, managing difficulty levels and adjusting as needed based on user interactions, managing motion sickness, performing home automation functions, and executing artificial intelligence or machine learning algorithms to manage difficulty levels, motion sickness, or home automation, and data relating to all other processes and features described herein, can be at least partially implemented using the control circuitry 504. The processes as described herein may be implemented in or supported by any suitable software, hardware, or combination thereof. They may also be implemented on user equipment, on remote servers, or across both.

In client-server-based embodiments, the control circuitry 504 may include communications circuitry suitable for allowing communications between two separate user devices to display an extend reality experience, set difficulty levels in an extended reality experience, to obtain user metrics during an extended reality experience, such as a virtual game, from a plurality of users to generate median data, compare median data with a current user's current data to determine whether the current user is or will be experiencing similar outcomes in the extended reality experience, determine starting and ending checkpoints for monitoring a current user, provide remedial actions based on user or plurality of user performance, manage difficulty levels and adjust as needed based on user interactions, manage motion sickness, perform home automation functions, and execute artificial intelligence or machine learning algorithms to manage difficulty levels, motion sickness, or home automation, and all related functions and processes as described herein. The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 508 that is part of the control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 508 may be used to store user statistics or group statistics as depicted in FIG. 8, difficult level values, user and plurality of user performance data or performance metric, starting and endings of checkpoints, data relating to home automation devices and their settings and any user preferences, lists of recommendations and remedial actions, and ML, and AI algorithms and all the functionalities and processes discussed herein. Cloud-based storage, described in relation to FIG. 5, may be used to supplement the storage 508 or instead of the storage 508.

The control circuitry 504 may include audio generating circuitry and tuning circuitry, such as one or more analog tuners, audio generation circuitry, filters or any other suitable tuning or audio circuits or combinations of such circuits. The control circuitry 504 may also include scaler circuitry for upconverting and down converting content into the preferred output format of the electronic device 500. The control circuitry 504 may also include digital-to-analog converter circuitry and analog-to-digital converter circuitry for converting between digital and analog signals. The tuning and encoding circuitry may be used by the electronic device 500 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 508 is provided as a separate device from the electronic device 500, the tuning and encoding circuitry (including multiple tuners) may be associated with the storage 508.

The user may utter instructions to the control circuitry 504, which are received by the microphone 516. The microphone 516 may be any microphone (or microphones) capable of detecting human speech. The microphone 516 is connected to the processing circuitry 506 to transmit detected voice commands and other speech thereto for processing. In some embodiments, voice assistants (e.g., Siri, Alexa, Google Home and similar such voice assistants) receive and process the voice commands and other speech.

The electronic device 500 may include an interface 510. The interface 510 may be any suitable user interface, such as a remote control, mouse, trackball, keypad, keyboard, touch screen, touchpad, stylus input, joystick, or other user input interfaces. A display 512 may be provided as a stand-alone device or integrated with other elements of the electronic device 500. For example, the display 512 may be a touchscreen or touch-sensitive display. In such circumstances, the interface 510 may be integrated with or combined with the microphone 516. When the interface 510 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 510 may be HDTV-capable. In some embodiments, the display 512 may be a 3D display. The speaker (or speakers) 514 may be provided as integrated with other elements of electronic device 500 or may be a stand-alone unit. In some embodiments, the display 512 may be outputted through speaker 514.

The equipment device 500 of FIG. 5 can be implemented in system 400 of FIG. 4 as primary equipment device 402, but any other type of user equipment suitable for allowing communications between two separate user devices for performing the functions related to implementing machine learning (ML) and artificial intelligence (AI) algorithms, and all the functionalities discussed associated with the figures mentioned in this application The electronic device 500 of any other type of suitable user equipment suitable may also be used to implement ML and AI algorithms, and related functions and processes as described herein. For example, extended reality headset or smart glasses or similar such devices may be used. Electronic devices may be part of a network of devices. Various network configurations of devices may be implemented and are discussed in more detail below.

FIG. 6 is a block diagram of an extended reality headset used in a gaming environment, in accordance with some embodiments of the disclosure.

In some embodiments, the extended reality devices, such as headsets, glasses, mobile phones, or other wearable devices, may be used to perform the processes described herein. The extended reality devices may be non-immersive, fully immersive, semi-immersive or have some other combination of virtual, augmented, or mixed reality. For example, the extended reality device may be an Oculus Rift™, Valve™, Sandbox VR™, or a Sony PlayStation VR™. It may also be smart/virtual glasses such as Iristick Z1™, Epson Moverio BT-200™, or Sony SmartEyeglass™. The non-immersive experiences may allow the user to experience a virtual game through a computer by allowing the user to control characters within the software without the user directly interacting with the virtual environment. A fully immersive experience may provide a realistic experience within the virtual world where the user interacts with the virtual environment based on their movements, e.g., a battle game where others are shooting at the user, a car race game where other cars in the race react based on how the user is driving, etc. There may also be some semi-immersive experiences that have a combination of both.

In some embodiments, the headsets may be a virtual reality headset where purely virtual experiences can be visualized. In other embodiments, the headsets may be a augmented reality headset where real world environment, including any virtual overlays, can be visualized. In yet other embodiments, the headsets may include dual functionality that has both VR and AR capabilities and are able to switch between AR and VR.

In some embodiments, the extended reality device may include a complete system with a processor and components needed to provide the full extended reality experience. In other embodiments, the extended reality device may rely on external devices to perform all the processing, e.g., devices such as smartphones, computers, and servers. For example, the headset may be a plastic, metal, or cardboard holding case that allows viewing, and it may be connected via a wire or wirelessly or via an API to a smartphone and use its screen as lenses for viewing. The headset may also be connected to a gaming console where the headset has its own display screen, which is powered by the computer or game console.

As depicted in FIG. 6, in one embodiment, the extended reality headset used includes 6DOF. Since the headset works by immersing the user into a virtual environment that has all directions, for a full immersive experience where the user's entire vision, including the peripheral vision, is utilized, an extended reality headset that provides the full 6DOF is preferred (although a extended reality headset with 3DOF can also be used).

Having the 6DOF allows the user to move in all directions and also experience objects and the environment in the virtual world from all directions, e.g., the user can move an object in a 3D space. These 6DOF correspond to rotational movement around the x, y, and z axes, commonly termed pitch, yaw, and roll, as well as translational movement along those axes, which is like moving laterally along any one direction x, y, or z. Tracking all 6DOF allows the system to capture the user movements, as well as their field of view, in both translational as well as rotational directions, thereby providing a full 360° view in all directions.

Although some references have been made to the type of extended reality headset, the embodiments are not so limited, and any other extended reality headset available in the market may also be used with the embodiments described herein.

Figure 7:
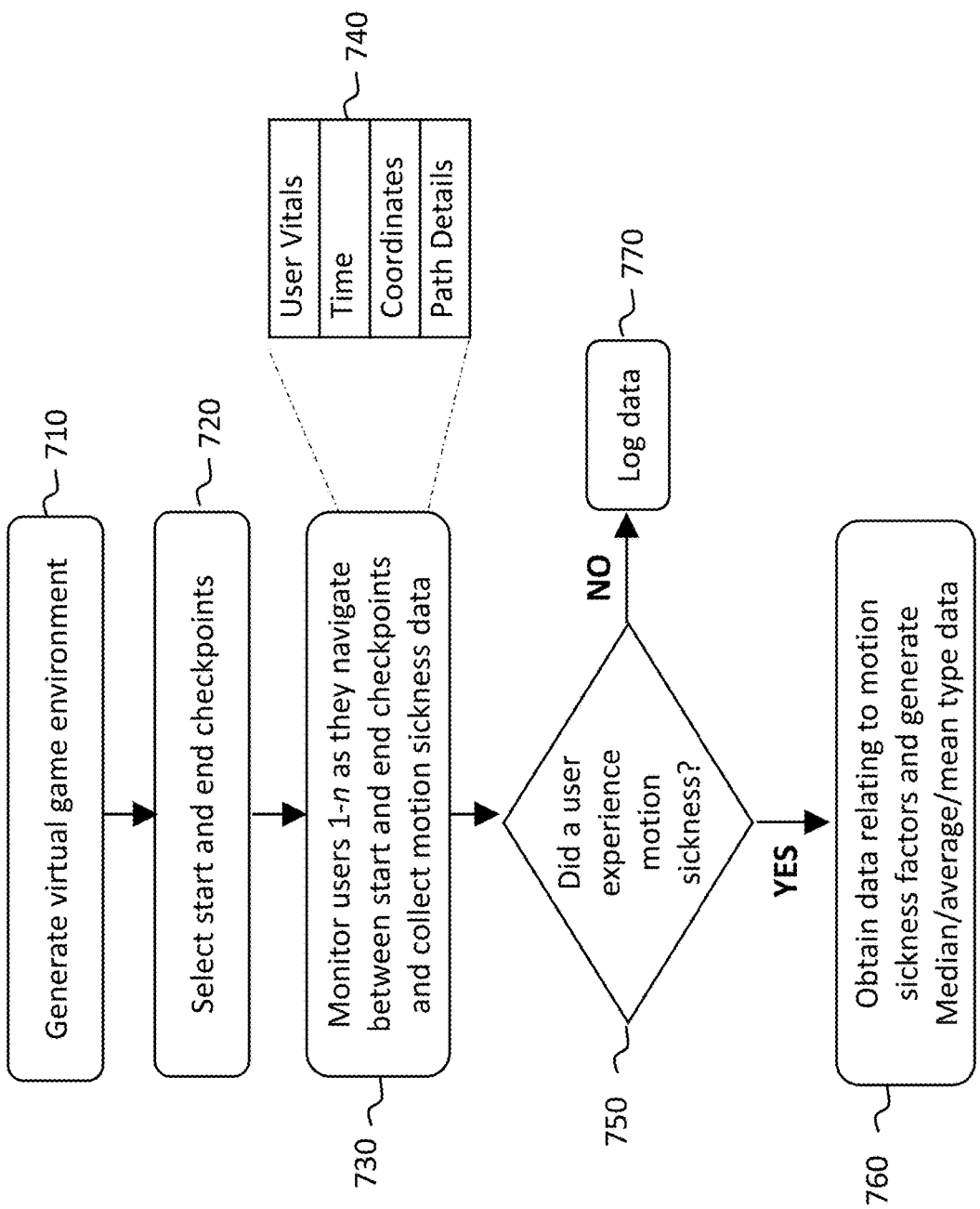
FIG. 7 is flowchart of a process for collecting data relating to motion sickness in a virtual gaming environment, in accordance with some embodiments of the disclosure.

FIG. 7 is flowchart of a process for collecting data relating to motion sickness in a virtual gaming environment, in accordance with some embodiments of the disclosure.

In some embodiments, at block 710, a gaming environment is displayed on an extended reality device. The gaming environment may be an extended reality environment that is displayed on the display screen associated with a VR headset, VR glasses, or another type of VR module. The gaming environment may display a virtual game with a plurality of challenges and assets and include virtual simulations of both real-world and fictional surroundings. The extended reality device on which the virtual game is displayed may be connected to cameras, lenses, display screens, speakers, motion producing components, and other equipment needed to provide a full extended reality experience. The extended reality device may be able to connect to external applications via an API to download or access a variety of games. In one embodiment, the virtual game displayed may have the layout as depicted in block 101 of FIG. 1.

At block 720, starting and ending checkpoints are selected. As described earlier, a game may have several checkpoints. A starting and an ending checkpoint within the game may be selected such that a challenge or an experience is included within the checkpoints. These challenges may be elevating to a next game level, an opportunity to score points, or a milestone within the game.

The checkpoints also act as a reference position in the game state that is saved for rollback or restart, such as when a character dies, the game may reload or restart from the last checkpoint. In some embodiments, checkpoints C1 and C2 are selected based on the type of extended reality game and its environment. For example, the game may not have fast-moving components or rapidly changing graphics, in which case checkpoints that have a longer time duration between them may be selected and data may be obtained at longer intervals such that the amount of data does not take up too much CPU and GPU space. For example, for a game of 10 minutes having four levels, where the game is a slower game, checkpoints of 300 seconds with data gathering at every 15-30 seconds may be appropriate.

On the other hand, for a fast-paced game that has several moving components or rapidly changing graphics, checkpoints that have a shorter time duration between them may be selected and data may be obtained at shorter intervals such as at every 12 second or every few milliseconds, such as 100 milliseconds, to ensure that any critical change in the game is not missed.

The greater the value of the time interval for collecting data, the smaller the log file, but the greater the risk of missing useful information or phenomena like user movements that may have occurred between data collections points. The shorter the value of the time interval for collecting data, the bigger the log file, which will also consume large amount of memory in the CPU and GPU. As such, some level of balancing to ensure adequate amount of data is collected while not overloading the CPU/GPU may be implemented. Such balancing efforts may take into consideration the type of application, as described above, e.g., whether it's a fast- or slow-moving game.

Blocks 730, 740, 750, and 760 are used for collecting motion sickness data from a plurality of users, aggregating the data, and computing a median that can be used against current and future users. To accomplish the collection, aggregation, and calculation of the median, in one embodiment, at block 730, the control circuitry monitors a plurality of users that engage in playing the virtual game. As the plurality of users progress through the path between C1 to C2, their data is collected. The data includes their translational as well as orientations movements (e.g., qw, qx, qy, and qz) between checkpoints C1 and C2. For example, if a user moves their head to the left, thereby moving their wearable headset to the left, then the field of vision when they turn left is recorded to determine which assets were in the user's view. All the obstacles encountered, challenges resolved, assets viewed, assets interacted, the user's vital signs during their movements, CPU/GPU utilizations during the game, motion sickness experienced, how long it took for the user to clear a level of difficulty, coordinates of a path taken by the user, the type of path, time at each segment of the path, and other gaming metrics, in addition to those depicted at block 740, are collected.

At block 730, among other types of data and metrics collected, data relating to motion sickness is also collected. Such data may be obtained from wearable devices, sensors, or other attachments associated with extended reality device, for example, a smartwatch that can detect heartbeats, body sensors, and other types of monitors that can collect the user's vital signs. The user may also input such data into a system that is associated with the extended reality environment. In yet another embodiment, the control circuitry may collect demographic user information, health profile information or other information before or during the extended reality experience. It may also acquire such information through another means (such as a profile from a content distribution storefront). The control circuitry may also obtain information such as time of day, time when last meal was consumed, the user's blood sugar level, etc. Additional examples of data that may be collected are depicted in FIG. 8 below.

At block 750, a determination is made whether user data, regardless of how it is collected, may be used to determine whether the user experienced motion sickness. Such determination may be made based on a medical profile of the user or general medical information available on the internet. The determination may also be made based on the user's behavior in the game, e.g., not being as attentive as the user was previously possibly indicating motion sickness, or the user themselves indicating that they are experiencing motion sickness by entering the information into a system associated with the extended reality environment. The system may also have an icon or selection available for the user to select if the user experiences motion sickness.

Figure 14:
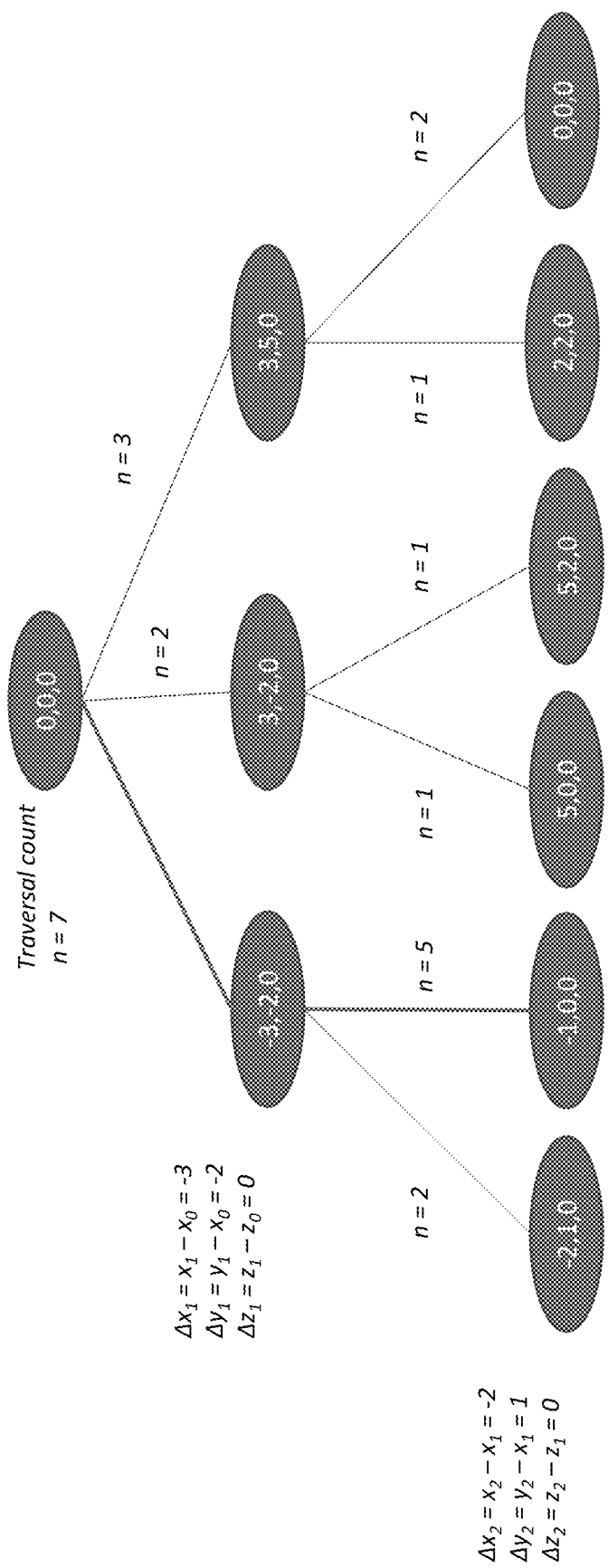
FIG. 14 is a navigation tree that depicts routes taken by a plurality of users between predetermined checkpoints in the virtual game, in accordance with some embodiments of the disclosure.

If motion sickness is detected at block 750, then, at block 760, the user's vitals and any one or more motion sickness-related data that was previously collected at block 730 is aggregated. Such aggregated data gives the content creator the ability to draw inferences on when the current user may or may not experience motion sickness. A median of the aggregated data is computed. The median data may include median orientations of users (qw, qx, qy, qz) at each point on the median path and provide details as to exactly where on the path motion sickness was experienced. An example of a median path is depicted in FIG. 14. The utilization of the median data obtained from a plurality of users and its application to the current user are further described in description of FIG. 9.

FIG. 8 is an example of a chart that depicts various user background factors that can be taken into account for determining motion sickness relating to playing of the virtual game, in accordance with some embodiments of the disclosure.

In some embodiments, a user's ethnicity, age, field dependency, illness, interpupillary distance, heritability, surveyed past susceptibility (various stimuli) and any prior medical history or symptoms,' such as causes of motion sickness due to certain environments, lack of sleep etc., user's severity of motion sickness, and other types of stimulus that cause motion sickness can be considered in determining whether any of such user background information plays a part in the user's motion sickness.

Whether it is when collecting data of a plurality of users, such as in block 102 of FIG. 1, or collecting current data of a current user, the data may be skewed based on the background information of the user. For example, in the data-collecting phase, such as in block 102 of FIG. 1, one user, from a plurality of users, may have experienced a large amount of motion sickness at a particular point in the game while other users, from a plurality of users, experience little or no motion sickness. Upon accessing the user's profile and based on further investigation into the user's background it may have been discovered that the user has certain medical issues due to their age or some other factor, such as past susceptibility, or interpupillary distance disorder. In one embodiment, the system may discard such user's data and consider it to be an outlier. In another embodiment, the system may log the data into records and apply it when a current user of similar background plays the virtual game.

In some embodiments, ethnicity, age, field dependency, illness, or heritability, may also play part in the motion sickness and such background information may be considered in evaluating a current user or when gathering data from prior users. In some embodiments, the system may group data into several groups based on the users' ethnicity. Such data may then be used if a determination is made that the current user is also of the same ethnicity. Likewise, age and other background data may be grouped and used accordingly. The system may also generate multiple subgroups with a combination of background information, such as generating a group for ethnicity and subgroups for different age ranges within the same ethnicity.

In some embodiments, based on the data collected, the system may anticipate the current user's likelihood and probability of getting motion sickness at a particular stage of the virtual game. For example, the system may determine that 72% of users that have played the game have prescription eyeglasses (as part of determining the users' backgrounds). If the system encounters a current user and determines based on the current user's profile, or through facial attributes detection, that the user is wearing prescription eyeglasses of a similar prescription number, then the system may determine the probability of the current user getting motion sick. Accordingly, the system either changes the game screens, provide alerts to the user to take different paths in the game, or simply cautions the user that they will likely experience motion sickness.

In some embodiments, the user may also review motion sickness data of the past users prior to or during the virtual game to determine their likelihood of getting motion sick. The system may also provide a manuscript or an outlook of the virtual game points at which the user is likely to get motion sick, and the user may avoid those points if they so choose.

Although a user's background, such as user's ethnicity, age, field dependency, illness, interpupillary distance, heritability, surveyed past susceptibility (and various other stimuli) have been described above in connection with determining or predicting motion sickness, such factors can also be used for determining their application to other virtual gaming and enhancing options. For example, such factors may be applied to determine a user's likely response to a level of game difficulty or response to a certain situation in a virtual game. For example, users of a certain younger age may be more likely based on their experience to take a particular path in the virtual game or not do well on a certain game level than others that are older. Likewise, certain users that are older may not be able to do well in certain situations compared to others that are younger. Additionally, other background factors, such as amount of virtual gaming experience, education, or motor skills, may also be used to determine if a user is likely to perform better in a certain virtual game situation.

Figure 9:
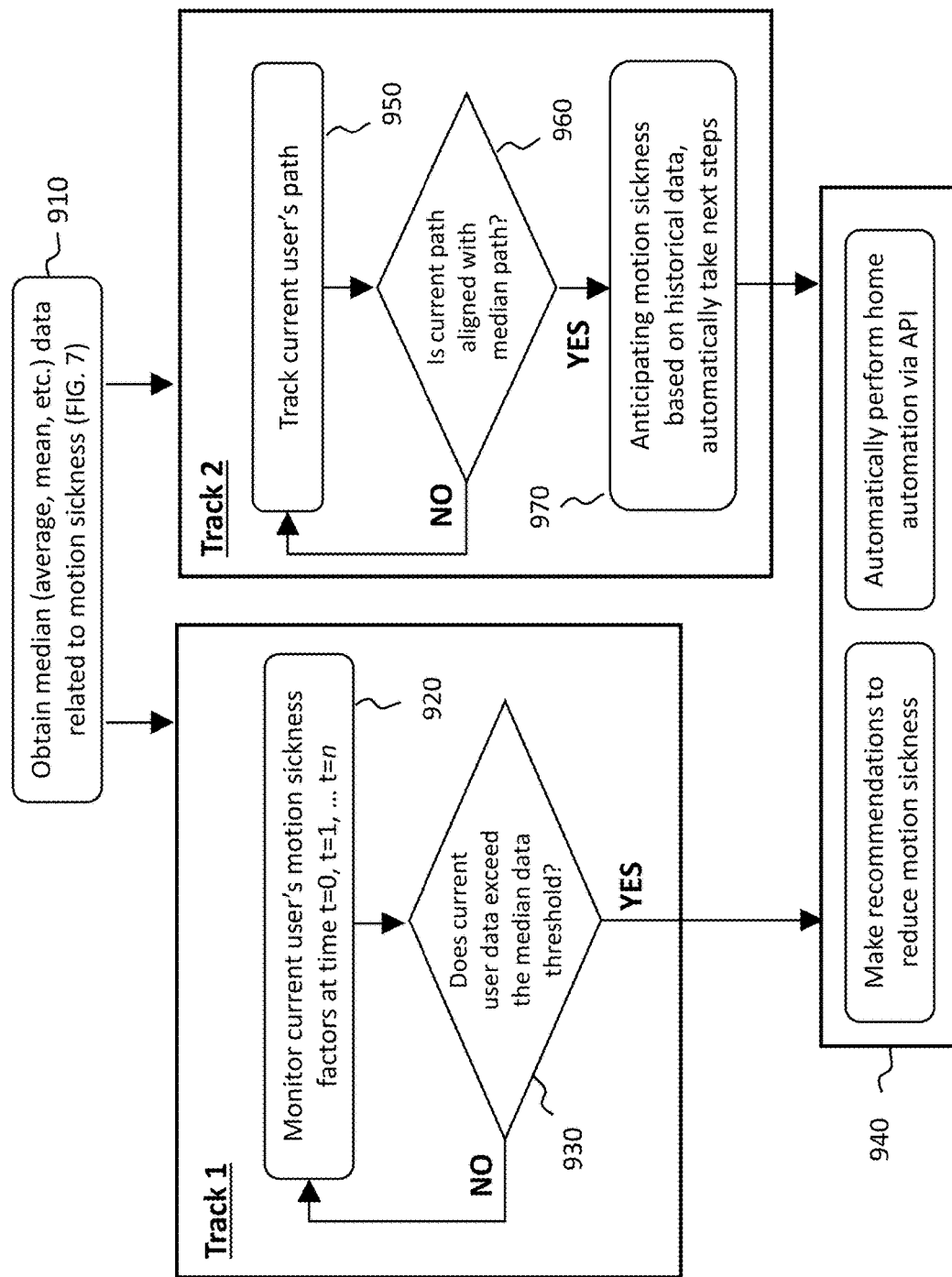
FIG. 9 is flowchart of a process for providing recommendations or activating home automation to manage motion sickness caused due to the virtual gaming environment, in accordance with some embodiments of the disclosure.

FIG. 9 is flowchart of a process for providing recommendations or activating home automation to manage motion sickness due to the virtual gaming environment, in accordance with some embodiments of the disclosure. As described above, FIG. 8 describes some embodiments of collecting data from a plurality of users, and FIG. 9 describes some embodiments of how such collected data can be applied to a current user to take remedial action that manages motion sickness or to provide other alternatives.

At block 910, median data is calculated based on the motion sickness data collected from a plurality of users as they navigate from checkpoints C1 to C2. Although calculation of median data is described, the embodiments are not so limited and calculations may also be made to determine an average, mean, standard deviation, variance, or some other calculation based on an equation.

Once the median data is calculated, in some embodiment the system may follow the path of Track 1 and in other embodiments it may follow the path of Track 2. Track 1 is associated with determining remedial action after discovering that the current user is experiencing motion sickness while Track 2 is associated with anticipating motion sickness and taking remedial action prior to the user getting motion sickness.

In one embodiment, either Track 1 or Track 2 may be selected by the system. In another embodiment, the system may select either Track 1 or Track 2 based on the user's preferences, such as preferences included in the user's profile. In another embodiment, the system may provide options for user selection that may be taken into account for determining whether Track 1 or Track 2 should be selected. In yet another embodiment, the system may analyze the user's prior gaming data, which may be obtained based on execution of machine learning algorithms, to determine the likelihood of the user getting motion sickness. If a determination is made that the user is likely to get motion sickness, then the system may select Track 2 where remedial actions are applied proactively and prior to the user experiencing actual motion sickness.

In some embodiments, in Track 1, at block 920, the system may monitor the current user's motion sickness factors at various times. These times may be at t=0, t=1, . . . t=n where the monitoring time "t" may be at a predetermined interval. The system may either monitor the user's motion sickness factors periodically or at all times during gameplay. In another embodiment, the system may monitor the user's motion sickness factors after certain milestones or challenges in the virtual game, such as a sharp drop in a virtual roller coaster in the virtual game.

At block 930, the control circuitry 420 or 428 determines whether the user's current data or factor is within threshold of media data. Some examples of the user's current data and median data are provided in FIG. 10.

In some embodiments, as depicted in FIG. 10, the control circuitry 420 or 428 may monitor user data at any one or more times during a virtual session, such as a virtual game or a virtual experience. It may also monitor user data at milestones in a game or at various gaming levels. It may also monitor user data periodically or continuously throughout the virtual session. The factors monitored may be any or more of heart rate, body temperature, perspiration levels, dizziness, loss of concentration, lack of responsiveness to game challenges, headaches, nausea, yawning, sighing, increased salivation, burping, blurred vision, drowsiness, spatial disorientation or any other like factors that are typically associated with motion sickness. The monitoring may be through cameras and sensors associated with the extended reality device. The monitoring may also be through data obtained from wearable devices, sensors, or other attachments connected to the extended reality device via an API.

One example of monitoring and comparing user's current data to the median data is depicted at 1010 in FIG. 10. In this example, data for a virtual experience, such a virtual game, virtual room, virtual education, or any other type of virtual experience, may be collected from a plurality of users. A median may be calculated for the data collected from a plurality of users. As mentioned above, other calculations, instead of a median calculation may also be used. One of the monitoring attributes may be to monitor the acceleration depicted in a virtual game that consists of a roller coaster ride. The acceleration may be measured at Curve 1 which may be a sharp curve during the virtual roller coaster ride. The system administrator or the game developer may have selected acceleration at Curve 1 to be monitored. For example, they may have selected to monitor Curve 1 because the curve has been designed in the virtual game to be a sharp curve where the user will experience a certain gravitational force, and the system administrator, or the game developer may anticipate potential motion sickness for certain people on this curve. Whatever the reason may be to monitor the acceleration at Curve 1, the median data calculated may show that a median user, from the plurality of users, had a median heartbeat of 72 BPM. The current user data at the same Curve 1 with the same acceleration may also be monitored, and the results may indicate that the current user's BPM is 75. The control circuitry 420 or 428 may determine whether the current user's BPM is within the threshold range of +/−5 BPM of the median BPM of 72.

Another example of monitoring and comparing the user's current data to the median data is depicted at 1020 in FIG. 10. Block 1020 is similar to block 1010 except that the data is monitored for acceleration at Curve 2. The median data calculated at Curve 2 may show that a median user, from the plurality of users, had a median heartbeat of 77 BPM while the current user data at the same Curve 2 with the same acceleration is at 84 BPM, i.e., higher than the allowed threshold of +/−5 of the median BPM of 77.

In yet another example, as depicted at 1030 in FIG. 10, data for a virtual experience may be collected from a plurality of users at time t=t1. In this example, at time t=t1 the virtual experience may comprise a rotation in a virtual room. The rotation may be a visual rotation that is visible in the user's headset, or it may be the user physically rotating in the real-world environment to perform an instruction provided in the virtual world. A median may be calculated at time t=t1 for the data collected from a plurality of users while they experience the real-world or virtual rotation in the virtual room. The system administrator or the game developer may have selected acceleration of the specific rotation based on its anticipated motion sickness potential. As depicted, the median data calculated, based on the data collected from the plurality of users, for the rotation at time t=t1 shows a median body temperature of 98 F. The control circuitry 420 or 428 while monitoring the user's current data may determine that the user's temperature is 100 F while undergoing the same virtual experience at time t=t1 as the plurality of users. The control circuitry 420 or 428 may also determine that the user's body temperature of 100 F is outside the threshold of +/−1 F from the median temperature of 98 F.

In another example, as depicted at 1040 in FIG. 10, data for a virtual experience, which in this case may be a virtual game, may be collected after 30 minutes of gameplay. The system administrator or the game developer may have selected the 30-minute mark to determine the amount of fatigue a game player may experience after playing the virtual game for 30 minutes and its causation of motion sickness. The 30-minute mark may also have been selected based on data obtained from machine learning or an AI algorithm that shows that users usually experience fatigue, eye strain, or other symptoms that cause them to experience motion sickness. Whatever the reason may be to monitor responsiveness of the user after 30 minutes of gameplay, the median data calculated, based on data collected from a plurality of users, may show that a median user has a scoring percentage of 67%. The level of responsiveness in this example may be measured based on the user's ability to score at a predetermined percentage. The level of responsiveness in this example may also be measured by determining the scoring percentage at which they perform after 30 minutes of gameplay and whether that is within a threshold of their starting scoring percentage. As depicted, the control circuitry 420 or 428 determines, while monitoring the user's current scoring percentage, that the current user's scoring percentage is 53%. The control circuitry 420 or 428 may determine that the user's scoring percentage is outside the +/−10% of the median scoring percentage.

Although some examples of monitoring have been described in relation to FIG. 10, the embodiments are not so limited, and other types of monitoring are also contemplated. For example, the control circuitry may also monitor the user's facial expressions to determine if the user is undergoing motion sickness. In this example, the control circuitry may compare the user's baseline facial expression to the facial expressions when points in the virtual experience such as fast curves, drops, or acceleration are depicted. The control circuitry may detect the change in facial expressions and determine if the user is undergoing motion sickness.

Referring back to block 930 of FIG. 9, if a determination is made at block 930 that the user data does not exceed the median data threshold, then the process returns to block 920 and is repeated until the user reaches checkpoint C2 or the end of the game.

If a determination is made at block 930 that the user data exceeds the median data threshold, i.e., the allowed threshold to deviate from the median data, then the process moves to block 940 where remedial action is taken.

In one embodiment, the remedial action may be to make recommendations to reduce motion sickness. These recommendations may be provided to the user, system administrator, virtual experience creator or any combination thereof. Some examples of motion sickness recommendations are provided below in relation to the discussion of FIG. 11.

In another embodiment, the remedial action may be to automatically perform home automation via an API. Some examples of types of home automation motion devices controlled are provided below in relation to the discussion of FIG. 12.

Referring back to block 910, as described earlier, another path that may be selected may be the path of Track 2. In one embodiment, at block 950, control circuitry 420 or 428 tracks the user's current path. This is a path taken by the user within checkpoints C1 and C2, such as checkpoints C1 and C2 depicted in FIG. 3.

Figure 16:
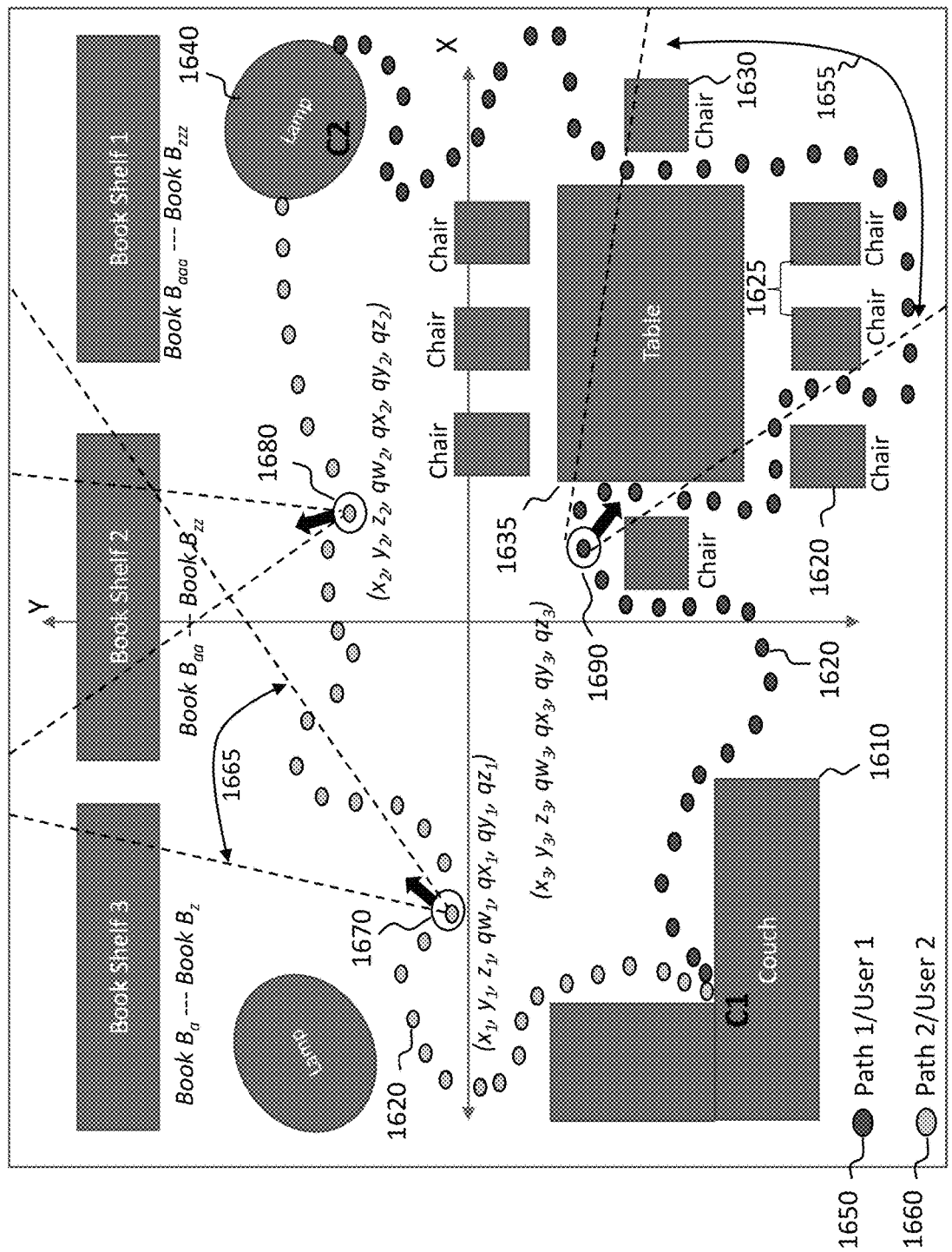
FIG. 16 is block diagram of a layout of a room and a plurality of paths taken to reach a destination, in accordance with some embodiments of the disclosure.

Tracking the user's current path may be accomplished by determining the user's coordinates on a periodic or continuous basis as the user navigates from checkpoints C1 to C2. For example, a user may select a path while navigating from the couch as depicted in FIG. 16 to the bookshelf 1. Such coordinates may be recorded or logged as shown in FIGS. 14 and 18.

At block 960, a determination is made whether the current path is aligned with the median path. In one embodiment, if the median user experienced motion sickness along the path and the current user's path is aligned with the median user, then the control circuitry 420 or 428 may anticipate that the current user will also experience motion sickness. On the other hand, if the median user did not experience motion sickness along the path and the current user's path is aligned with the median user, then the control circuitry 420 or 428 may anticipate that the current user will not experience motion sickness. The control circuitry 420 or 428 may also apply the current user's background data, such as from FIG. 8, to adjust or deviate from the median path and determine if the user will experience motion sickness based on their background.

At block 960, if a determination is made that the current user's path does not align with the median path, then the process returns to block 950, where the current user's path continues to be tracked until it aligns with the median path or until end of checkpoint C2 or the virtual experience.

At block 960, if a determination is made that the current user's path aligns with the median path, then the process moves to block 940 where remedial action is taken.

In one embodiment, the remedial action may be to make recommendations to reduce motion sickness. These recommendations may be provided to the user, system administrator, virtual experience creator or any combination thereof. Some examples of motion sickness recommendations are provided below in relation to the discussion of FIG. 11.

In another embodiment, the remedial action may be to automatically perform home automation via an API. Some examples of types of home automation motion devices controlled are provided below in relation to the discussion of FIG. 12.

Figure 11:
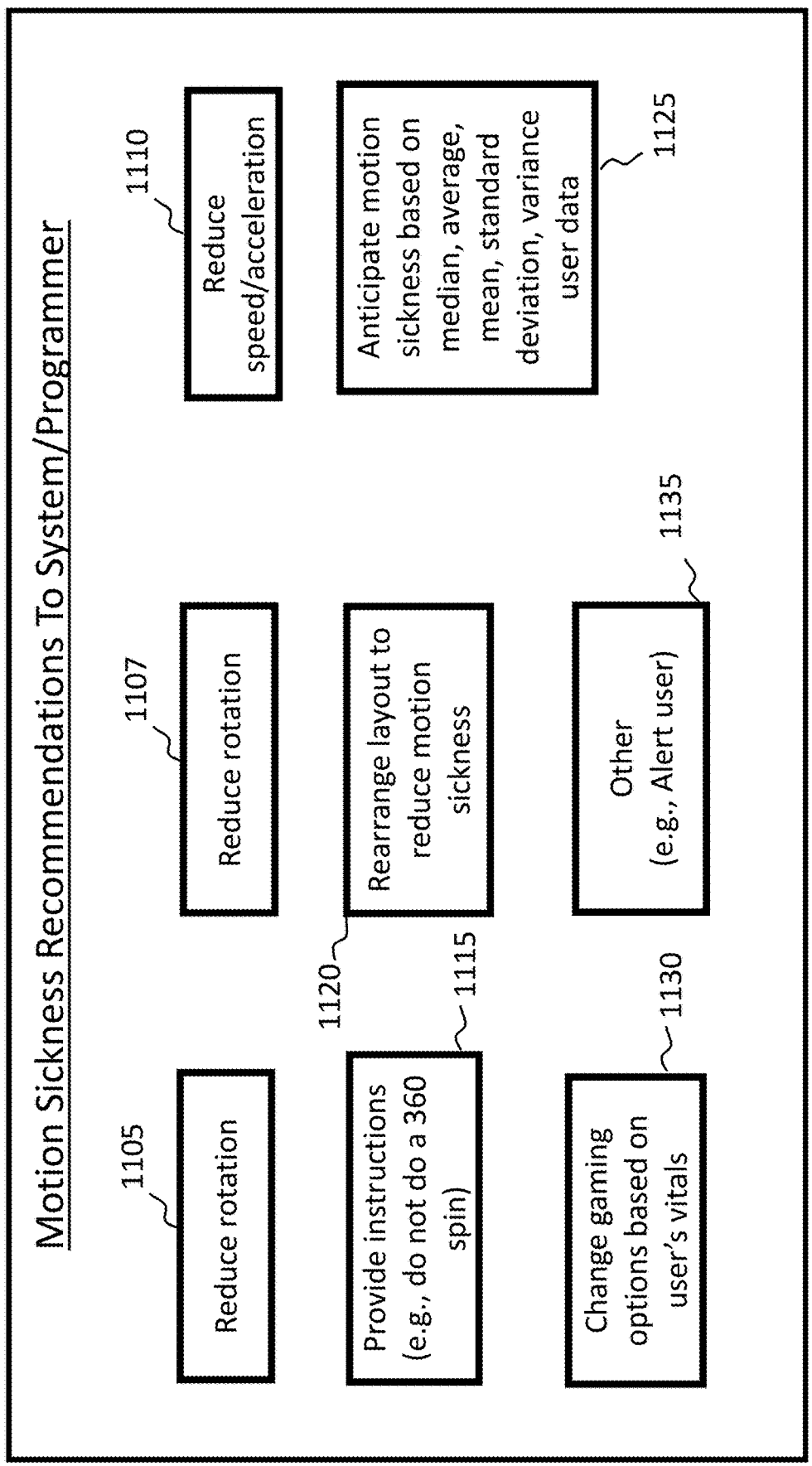
FIG. 11 is a block diagram of categories of recommendations that can be made to manage motion sickness in the virtual gaming environment, in accordance with some embodiments of the disclosure.

As depicted at block 1105 in FIG. 11, one type of recommendation made to the current user may be to reduce rotations. In this embodiment, control circuitry 420 or 428 may determine that the amount of rotations in the virtual experience are causing motion sickness to the user. As such, control circuitry 420 or 428 may provide an alert to the user to reduce the number of rotations either in the virtual or the real environment to minimize the amount of motion sickness. If prior rotations are not the causing factor for the motion sickness, the control circuitry 420 or 428 may still provide an alert to the user to reduce the number of rotations going forward in the game, i.e., either in the virtual or the real environment, to minimize the amount of motion sickness.

In another embodiment, control circuitry 420 or 428 may provide the recommendations to the user to change their current path, which may be causing motion sickness, to a new path, that is less likely to cause motion sickness. For example, the control circuitry 420 or 428 may associate a path with a certain motion sickness value based on the amount or twists, turns, orientations, speed, acceleration, and other factors that may cause motion sickness. The control circuitry 420 or 428 may determine that another path with a lesser motion sickness value is suitable for the current user and as such will recommend the current user to change to the new path. In another embodiment, the control circuitry 420 or 428 may close or block out paths that have a high motion sickness value when such is needed.

In another embodiment, control circuitry 420 or 428 may provide the recommendations to reduce rotations to the system administrator or the creator of the virtual game. Such recommendations may allow the system administrator or the game creator to either provide alternative screens in the game that have fewer rotations or remove any instructions in the game that require the current user to perform rotations.

As depicted at block 1110, another type of recommendation made to the current user may be to reduce their speed or acceleration in the virtual experience. In this embodiment, control circuitry 420 or 428 may determine that the amount of speed or acceleration in the virtual experience is a factor contributing to the user's motion sickness. As such, control circuitry 420 or 428 may provide an alert to the user to reduce the amount of speed or acceleration.

For example, the user may be using their virtual headset to play a virtual car racing game in which the user is in control of the amount of speed and acceleration as the virtual car as the game speeds across the roadway or takes sharp turns. The control circuitry 420 or 428 may alert the user to reduce their speed or acceleration as they are making their turns. The control circuitry 420 or 428 may also suggest to the system administrator or the game developer that it should either limit the amount of speed and acceleration or the curvature of the curve at which the car can take a turn to minimize the amount of motion sickness.

As depicted at block 1115, the recommendation may be in the form or instructions provided as a pop-up screen or by other visual or auditory means to the user. For example, the control circuitry 420 or 428 may send an audio signal to the users headphones instructing the user not to perform a 360° spin.

As depicted at block 1120, one type of recommendation may be made to the system administrator or game creator to rearrange the layout of the virtual space, such as a layout of a virtual room or layout of a virtual roller coaster or a virtual car racing game, to reduce motion sickness. For example, based on motion sickness experienced by the median user and the current user, the circuitry 420 or 428 may provide a recommendation to the system administrator or game creator to reduce the amount of ups and downs in a virtual roller coaster, change the number of turns or the angles of turns in a roller coaster or car racing game, or change the layout of a virtual mountain climbing experience with deep drops to minimize or reduce motion sickness. The recommendation may be general or specific outlining which challenges or obstacles to remove or reduce to reduce motion sickness.

As depicted at block 1125, the control circuitry 420 or 428 may anticipate motion sickness based on median user data. As described earlier, if the median user data suggests that a median user experiences motion sickness at a particular time or during a particular segment of the virtual experience, then the control circuitry 420 or 428 may anticipate a similar amount of motion sickness for the current user if the current user follows a similar path as the median user.

As depicted at block 1130, the circuitry 420 or 428 may monitor the user's vitals as the user plays the virtual game or navigates from checkpoints C1 to C2 in another type of virtual experience. Based on the monitoring of the vitals, the circuitry 420 or 428 may make recommendations to the system administrator or game creator to take certain remedial actions. For example, in some embodiments, the virtual game or virtual experience may be created such that alternative paths may be available to a user when the user comes upon a certain point in the game. The circuitry 420 or 428 may make a recommendation to the system administrator or game creator to eliminate one of the alternative paths on which motion sickness may be experienced and maintain another path which has a lesser likelihood of causing motion sickness. In another embodiment, based on the user's vitals, other game changing options, such as change in graphics, orientations, rotations, speed, or acceleration, may also be suggested.

As depicted at block 1135, the circuitry 420 or 428 may provide other types of alerts to the current user to minimize the motion sickness. For example, a visual alert with arrows may point towards the path of fewer twists and turns or lesser shift in center of gravity of the user due to the motions in the virtual or the real world.

Figure 12:
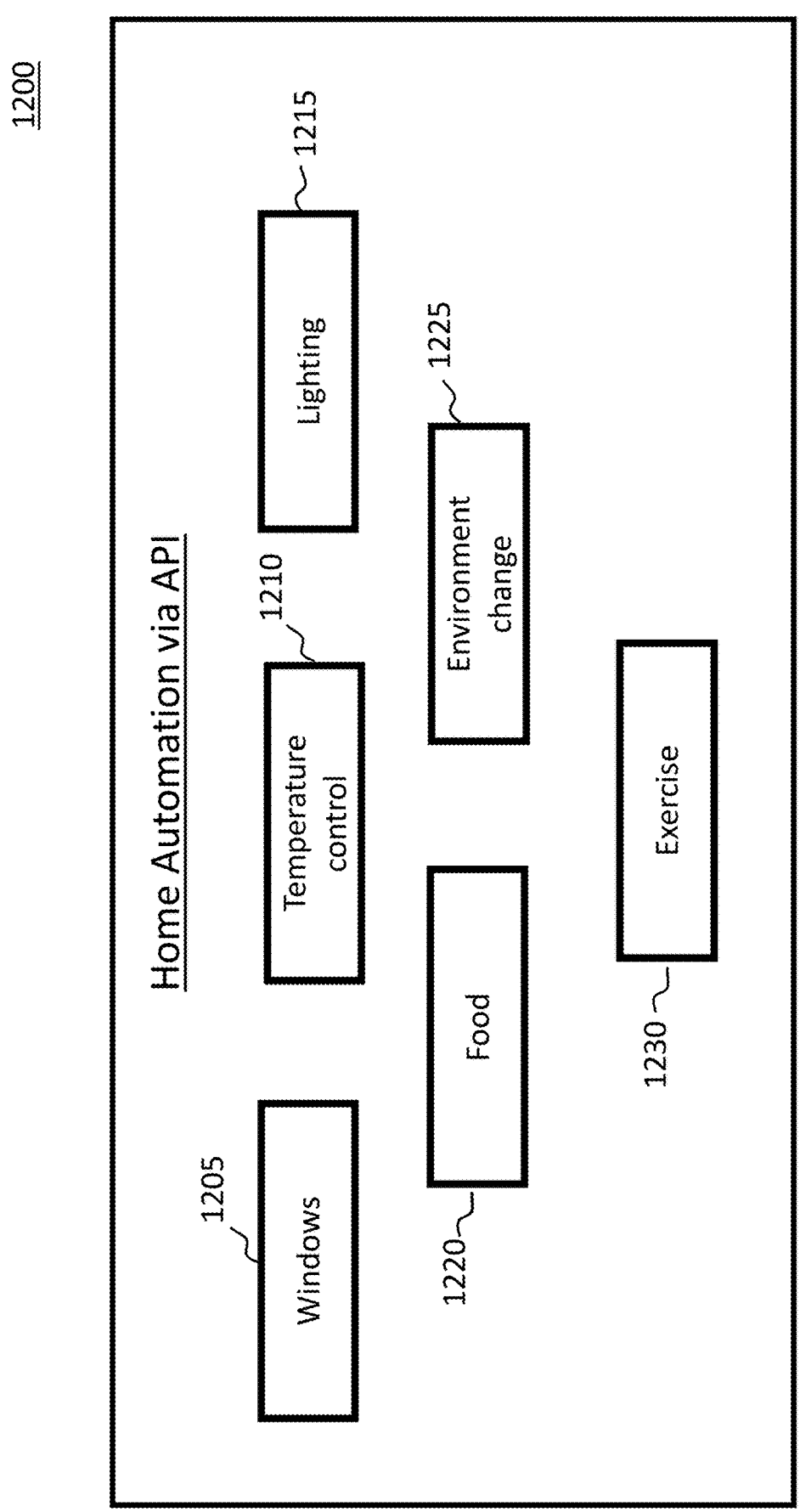
FIG. 12 is a block diagram of categories of devices and machines that can be activated via an API to manage motion sickness in the virtual gaming environment, in accordance with some embodiments of the disclosure.

FIG. 12 is a block diagram of categories of devices and machines that can be activated via an API to manage motion sickness in the virtual gaming environment, in accordance with some embodiments of the disclosure.

In one embodiment, as depicted at block 1205, windows of a physical home may be controlled via an API as a remedial measure to reduce motion sickness. In this embodiment, the windows may include an automatic mechanism that allows the windows to be controlled electronically such that they can be opened and closed based on the type of signal received. In this embodiment, the windows may be connected wirelessly to either the control circuitry 420 or 428 associated with the headset or to a gaming server or other intermediary home hub that is connected to both the headset and to a gaming server and the automated windows.

In one embodiment, if the control circuitry 420 or 428 determines that the user has experienced motion sickness, such as at block 930 of FIG. 9, then the control circuitry 420 or 428 may send a signal to open the windows thereby allowing light and fresh air to enter the location of the user to reduce the user's motion sickness.

In another embodiment, if the control circuitry 420 or 428 anticipates that the user will likely experience motion sickness, such as at block 970 of FIG. 9, then the control circuitry 420 or 428 may send a signal to open the windows in anticipation of the user getting motion sick and to prevent such occurrence. The control circuitry 420 or 428 may also determine the weather outside the house and take that into consideration when opening the windows. For example, if is in the middle of winter and it's cold outside, such as 32 F, then the control circuitry 420 or 428 may open the windows only for a short duration of time, such as two to five minutes, to prevent the area getting very cold.

In another embodiment where home automation is applied, as depicted at block 1210, temperature of the room in which the current user is playing the virtual game or experiencing the virtual environment through their headset may be changed as a remedial measure to reduce motion sickness. In this embodiment, the temperature controller or thermostat may include a Wi-Fi or API capability that allows the controller to be controlled electronically such that the temperature can be raised or lowered based on the type of signal received.

For example, thermostats like Google Nest™, Honeywell™ thermostat, or Ecobee™ Home are types of thermostats that include Wi-Fi controlling capability. In this embodiment, such example thermostats and other types of temperature controllers may be connected wirelessly to either the control circuitry 420 or 428 associated with the headset or to a gaming server or other intermediary home hub that is connected to both the headset and to a gaming server and the Wi-Fi and API-enabled thermostats.

In one embodiment, if the control circuitry 420 or 428 determines that the user has experienced motion sickness, such as at block 930 of FIG. 9, then the control circuitry 420 or 428 may send a signal to the thermostat. The signal may be to lower the temperature, such as by turning on air conditioning, or turn on the fan or increase its speed, thereby allowing flow of air and lowering of temperature to reduce the user's motion sickness.

In another embodiment, if the control circuitry 420 or 428 anticipates that the user will likely experience motion sickness, such as at block 970 of FIG. 9, then the control circuitry 420 or 428 may send a signal to lower the temperature, such as by turning on air conditioning, or turn on the fan or increase its speed thereby allowing flow of air and lowering of temperature in anticipation of the user getting motion sick and to prevent such occurrence. In some environments, the control circuitry 420 or 428 may also store the user's preferred temperature settings and automatically set the thermostat to reach the preferred temperature either when motion sickness is experienced or in anticipation of the motion sickness.

In another embodiment where home automation is applied, as depicted at block 1215, lighting in the room in which the current user is playing the virtual game or experiencing the virtual environment through their headset may be changed as a remedial measure to reduce motion sickness. In this embodiment, the lighting modules and controllers may include a Wi-Fi or API capability that allows the lighting modules and controllers to be controlled electronically such that the light can be turned on/off or the intensity of the lighting can be changed.

For example, Smart Home lightning controllers, switches, and modules, such as smart switches from Lutron™, Insteon™, Wemo™, and Phillips™ may include Wi-Fi controlling capability. In this embodiment, such example smart lighting switches and smart home devices with lighting may be connected wirelessly to either the control circuitry 420 or 428 associated with the headset or to a gaming server or other intermediary home hub that is connected to both the headset and to a gaming server and the Wi-Fi and API-enabled thermostats.

In one embodiment, if the control circuitry 420 or 428 determines that the user has experienced motion sickness, such as at block 930 of FIG. 9, then the control circuitry 420 or 428 may send a signal to the smart lighting switch. The signal may turn on the lighting in the user's location, brighten the lighting, or, in case of lights that are movable, move the lighting direction to point in the direction of the user, thereby illuminating the user's area in an attempt to allow the user's brain to react positively to brighter lights and reduce the user's motion sickness. Since poor peripheral vision or lack of awareness of the surroundings can be contributing factors for motion sickness, such lighting may help in reducing the motion sickness.

In another embodiment, if the control circuitry 420 or 428 anticipates that the user will likely experience motion sickness, such as at block 970 of FIG. 9, then the control circuitry 420 or 428 may send a signal to the smart lighting switch. The signal may turn on the lighting in the user's location, brighten the lighting, or, in case of lights that are movable, move the lighting direction to point in the direction of the user, thereby illuminating the user's area in an attempt to allow the user's brain to react positively to brighter lights and reduce the user's motion sickness.

In yet another embodiment, as depicted at block 1220, devices such as a refrigerator, water cooler, or other devices that store food may be illuminated or produce an auditory sound to suggest to the user that they should eat some food or drink something as a remedial measure to reduce motion sickness. In this embodiment, refrigerators that have touchscreen display panels on their outer surface, have Wi-Fi connecting capability, or are API-enabled may be connected and controlled electronically to lighten the touch screen display or wake up their touch screen, or illuminate their screen in a certain color. Such refrigerators may also provide a textual alert on the touch screen, such a glass of orange juice, or produce an audio signal or speech alerting the user to eat food or drink liquid to reduce their motion sickness. Such remedial measures may be taken if the user has experienced motion sickness or in anticipation that they may experience it based on the path the user is currently taking in the virtual experience.

In another embodiment, as depicted at block 1225, the control circuitry 420 or 428 may automatically turn ON several other Wi-Fi or API-capable devices, such as fans, music players, doors, recliners, etc., to change the environment in the room as a remedial measure to reduce motion sickness. In this embodiment, the Wi-Fi or API-capable devices may allow them to be controlled electronically by the control circuitry 420 or 428.

In one embodiment, if the control circuitry 420 or 428 determines that the user has experienced motion sickness, such as at block 930 of FIG. 9, or it anticipates that the user will likely experience motion sickness, such as at block 970, then the control circuitry 420 or 428 may send a signal to the Wi-Fi or API-capable devices. The signal may be to perform a combination of actions to change the environment to reduce the user's motion sickness. For example, if the user is playing the virtual game on a Wi-Fi-enabled recliner, then the control circuitry 420 or 428 may sit the user upright from the reclined position or vice versa to change their environment.

In another embodiment where home automation is applied, as depicted at block 1230, exercise equipment that is located in or nearby the room in which the current user is playing the virtual game or experiencing the virtual environment through their headset may be turned on and the user may be alerted to use the turned-on exercise machine in an attempt to reduce motion sickness. In this embodiment, the exercise machine may include a controller that is Wi-Fi or API-enabled. The exercise machine controller may be controlled electronically such that it can be turned on and its speed adjusted.

For example, exercise bikes and machines such as Peloton™, NordicTrack™, or smart home gym machines such as Tonal™ and other like smart exercise equipment may include Wi-Fi controlling capability. In this embodiment, such smart exercise equipment may be connected wirelessly to either the control circuitry 420 or 428 associated with the headset or to a gaming server or other intermediary home hub that is connected to both the headset or to a gaming server and the Wi-Fi and API-enabled thermostats.

In one embodiment, if the control circuitry 420 or 428 determines that the user has experienced motion sickness, such as at block 930 of FIG. 9, then the control circuitry 420 or 428 may send a signal to the smart exercise equipment. The signal may be to turn on the smart exercise equipment. The signal may also be to illuminate the smart exercise equipment, such as those having a display screen, or produce an auditory alert for the user to start exercising to reduce the user's motion sickness.

In another embodiment, if the control circuitry 420 or 428 anticipates that the user will likely experience motion sickness, such as at block 970 of FIG. 9, then the control circuitry 420 or 428 may send a signal to illuminate the smart exercise equipment, such as those having a display screen, or produce an auditory alert for the user to start exercising to reduce the user's motion sickness. Since certain exercises may reduce motion sickness, the smart exercise systems may also be automatically controlled to turn on a program that is related to such motion sickness-reduction exercises.

Although a few examples of types of home automation and smart devices have been described above, the embodiments are not so limited in other types of home automation devices are also contemplated. For example, in some embodiments, the control circuitry 420 or 428 performs smart home automation functions to minimize or reduce a current user's motion sickness. The functions are performed either after determining that the current user has experienced motion sickness or proactively before the current user experiences motion sickness.

The embodiments include the control circuitry 420 or 428 generating an extended reality experience for display on an extended reality device, such a VR headset. The 420 or 428 determines whether a current user is or will be experiencing motion sickness based on a path taken by the current user in the extended reality experience. Since some paths have more motion sickness elements than other paths or some points or locations along a same path have more motion sickness elements than other points and location, the control circuitry 420 or 428 analyses the paths and determines which is more suitable for the current user. Some examples of such elements may be a sudden turn or orienting of the user either in the virtual world of in the real world, fast speeds, acceleration to negative gravity, sudden drops in roller coaster, shift in center of gravity in the virtual or real world, and subjecting the user to heights etc.

In some embodiments, the control circuitry 420 or 428 activates a smart home device to manage the current user's motion sickness in response to determining that the current user is or will be experiencing motion sickness based on the path taken in the extended reality experience. In these embodiments, the control circuitry 420 or 428 determines which smart home devices are in the vicinity of the user, i.e., within a threshold distance. To do so, the control circuitry 420 or 428 scans for a smart home devices, such as by using Bluetooth, and pairs the discovered smart home devices with the extended reality device, such as via an API.

The threshold distance between the extended reality device and the discovered smart home device is determined by the control circuitry 420 or 428. If the distance is within a threshold, which is set by the control circuitry 420 or 428, then the smart home device may be used by the control circuitry 420 or 428. Devices that are outside a room, outside FOV of the current user, or over a certain distance away, such as 30 feet away, may deemed to be out of the threshold distance.

In some embodiments, the control circuitry 420 or 428 smart home devices are turned on once a determination is made that the current user is likely going to experience motion sickness. To make such a determination, the control circuitry 420 or 428 obtains machine learning data from a plurality of users that have taken the same path as the current user. The control circuitry 420 or 428 the compares the current user's path with the average, mean, or median path, or another representative path, from the plurality of users. The control circuitry 420 or 428 determines which locations on the path the plurality of users experienced motion sickness and if the current user is on the same path or approaching the same location on the same path where the average user from the plurality of users got motion sick, then the control circuitry 420 or 428 determines that the current user is also likely to get motion sick on the same path or the same location along the path.

Some examples of smart home device activated by the control circuitry 420 or 428 include a fan, air conditioner, lights, refrigerator, exercise equipment, temperature controller, a window opening device, and a chair reclining device.

In some embodiments, the control circuitry 420 or 428 accesses a user profile of the current user. The control circuitry 420 or 428 obtains user preferred settings for the smart home device from the user profile. For example, the current user may prefer the air conditioning to be at 70° F., the fan to be at the $3^{rd}$ speed, or the lights to be at a certain luminosity. The control circuitry 420 or 428 use such preferences and turns on the smart home devices to the preferred user settings.

In another embodiment, the control circuitry 420 or 428 determines whether the activated smart device has resulted in reducing the current user's motion sickness. It may do so based on the current user's performance in the extended reality experience, such as they are not scoring at the same percentage. It may also receive an input from the current user that indicates that they continue to experience motion sickness. It may also come to a conclusion that the current user is experiencing motion sickness if the current user's vital match those related to motion sickness, such as sweating, or body heating up. The control circuitry 420 or 428 in response to determining that the activated smart device has not resulted in reducing the current user's motion sickness may increasing the setting of the smart home device to a higher level, such as the air conditioning to lower temperature, fan to a higher speed, the window to a wider opening etc. The control circuitry 420 or 428 may also activate more than one smart home device simultaneously to increase the efforts in reducing motion sickness.

Figure 13A:
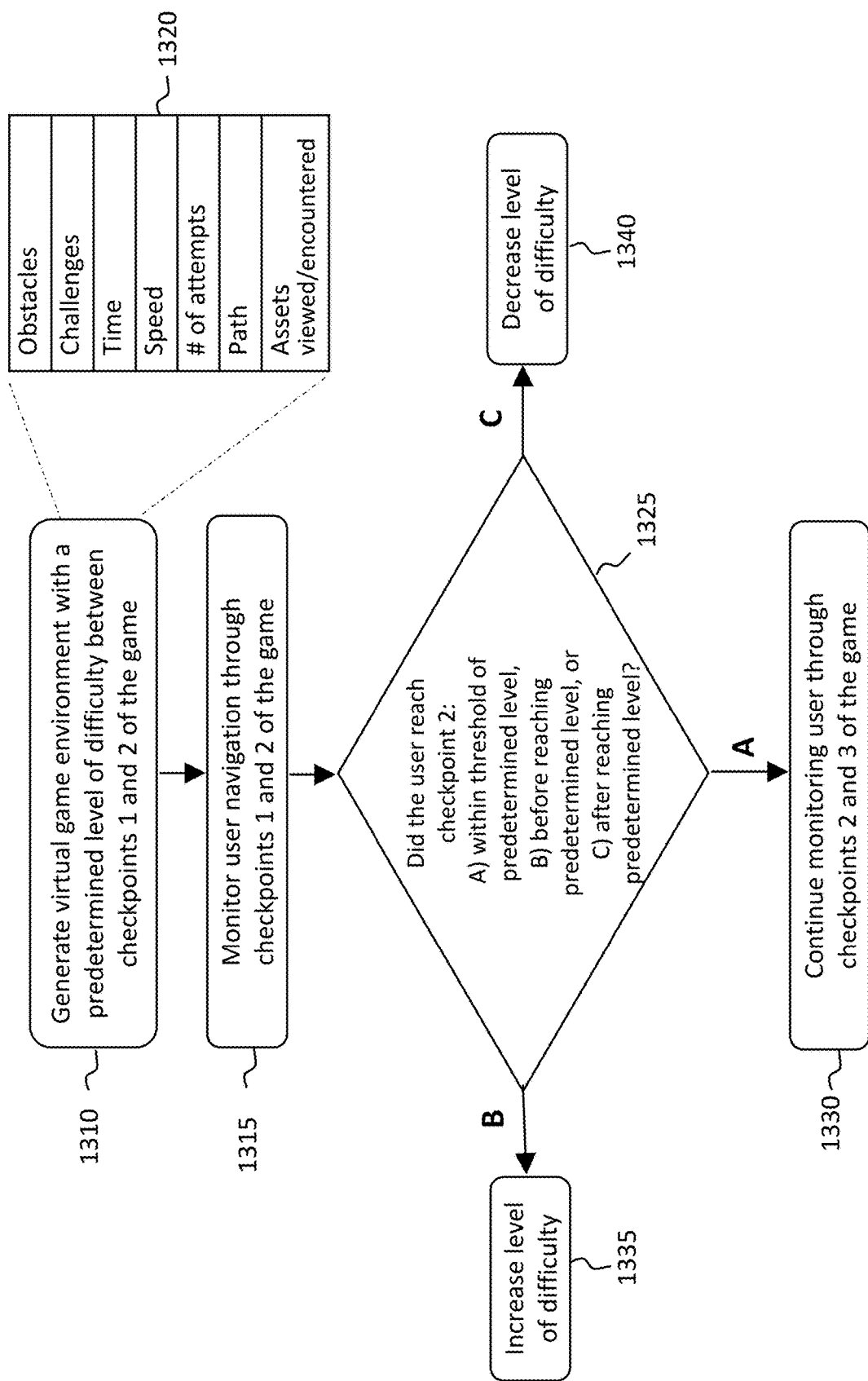
FIG. 13A is flowchart of a process for collecting data relating to a user's handling of levels of difficulty in the virtual game and using the data to enhance or manage levels of difficulty, in accordance with some embodiments of the disclosure.
Figure 13B:
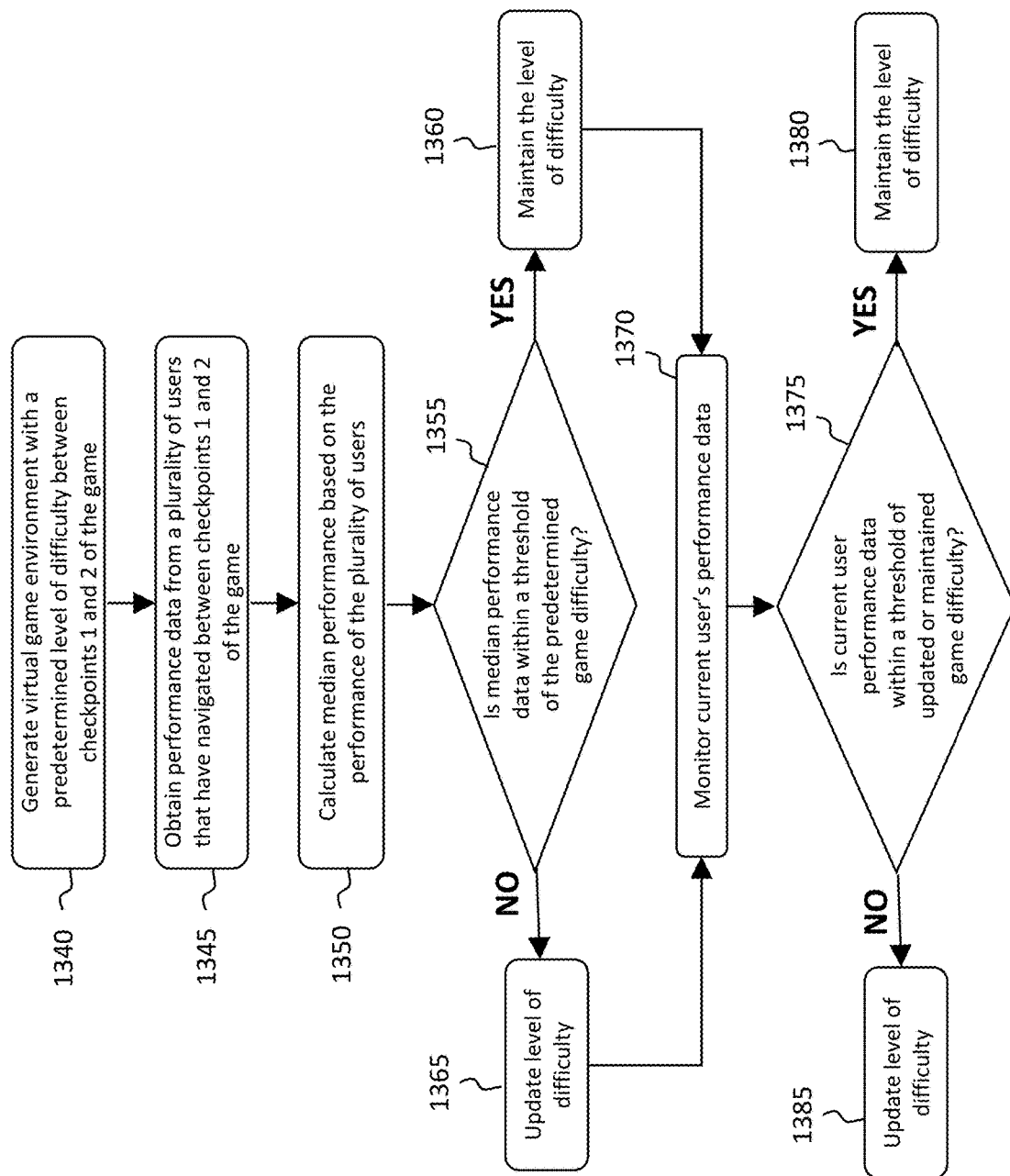
FIG. 13B is flowchart of a process for comparing current user data with median user data for managing levels of difficulty in the virtual game, in accordance with some embodiments of the disclosure.

FIGS. 13A and 13B are flowchart of a process for collecting data relating to a user's handling of levels of difficulty that are predetermined for a virtual experience or a virtual game. In one embodiment, FIG. 13A relates to managing the predetermined levels of difficulty and adjusting the levels of difficulty based on a comparison between a current user's performance in the virtual experience or a virtual game and the levels of difficulty that are predetermined by the control circuitry or the content creator. In other words, determining whether the current user handled the system set level of difficulty with ease, hardship, or as expected. FIG. 13B on the other hand compares the current user's performance data in the virtual experience or a virtual game with a median, average, or a representative user. The median user data is computed based on data gathered, also referred to as performance metric, by the control circuitry from a plurality of users that have played the virtual game or experienced the virtual experience.

Specifically, according to some embodiments, FIG. 13 is a flowchart of a process for collecting data relating to a user's handling of levels of difficulty in the virtual game and using the data to enhance or manage levels of difficulty.

In some embodiments, at block 1310, control circuitry 420 or 428 may generate a virtual game environment with a predetermined level of difficulty between checkpoint one and checkpoint two of the virtual game. In another environment, if it is not a virtual game, it might be some other virtual experience that may require a user to navigate from checkpoint C1 to checkpoint C2 with certain obstacles in between.

In one embodiment, the predetermined level of difficulty may involve certain types of obstacles or challenges. The control circuitry 420 or 428 may anticipate a user to take a certain amount of time or a certain amount of steps prior to solving these obstacles and challenges.

In one embodiment, the predetermined level of difficulty may involve clearing or passing a gaming level after a certain time period. For example, in a virtual game that is at higher level or advanced level in the game, such as a level 6 in a virtual game of eight levels, the designer of the game may have designed the level 6 such that a user takes at least three minutes and a minimum of five attempts to clear the challenges at level 6 of the virtual game.

As such, the control circuitry 420 or 428 may be configured to determine whether the designed level of difficulty at level 6 is successfully conquered by the user before the threshold time of three minutes.

In one embodiment, the predetermined level of difficulty may involve a certain speed rating designed by the game designer. For example, in a virtual car racing game there may be curves that are designed such that a user may not be able to take the curve faster than 70 mph without crashing into the wall or losing control of the car and spinning their car in circles. In this embodiment, the control circuitry 420 or 428 may be configured to determine whether the user is able to drive their virtual car in the virtual car racing game above the difficulty threshold of 70 mph without crashing into the wall or spinning out of control.

In another embodiment, the predetermined level of difficulty may involve passing through a certain path within a threshold number of attempts. For example, in a virtual game a certain path between checkpoint C1 and checkpoint C2 may be designed a difficulty level such that a user may not be able to successfully reach the end of the path in less than three attempts. In this embodiment, the control circuitry 420 or 428 may be configured to determine whether the user is able to reach the end of the path in fewer attempts, such as one or two attempts.

In yet another embodiment, the predetermined level of difficulty may be designed such that discovering a certain number of assets that are hidden from the user requires the user to solve certain challenges for the hidden assets to be revealed. The difficulty level in this embodiment may be designed such that the user cannot discover all the assets without getting killed at least once or within a certain predetermined amount of time. In this embodiment, the control circuitry 420 or 428 may be configured to determine whether the user is able to discover more than the threshold number of assets or pass the level prior to the anticipated time.

At block 1315, control circuitry 420 or 428 may monitor the user's navigation through checkpoints C1 and C2 of the virtual game. The monitoring may be performed by using cameras, sensors, heartbeat monitors, or any other wearable devices that are connected to the extended reality headset via an API. For example, as mentioned in some of the examples above, the control circuitry 420 or 428 may monitor the user's navigation to determine whether the user is able to successfully complete an obstacle or a challenge or reach the end of a level or path in fewer attempts or in shorter time than designed for the difficulty level. The control circuitry 420 or 428 may then compare the user's performance with the difficulty level set in that level of the game by the control circuitry 420 or 428 to determine if the user was able to beat the difficulty level with ease.

At block 1325, in one embodiment, a determination is made that A) the user is able to successfully reach checkpoint C2 and the user is able to do so within the threshold of the predetermined difficulty level. In other words, the user is able to perform at the difficulty level as expected or for which the difficulty level was designed, for example reaching the end of the path in four attempts when the difficulty level was designed for a user to take at least three attempts to reach the end of the path. In another example, the user was able to complete the difficulty level in three minutes and the level was designed such that a user may not be able to get to checkpoint C2 in under two minutes. In response to such a determination at block 1330, the system may continue monitoring the user through the rest of the game, such as through checkpoints C2 and C3 to determine if the user meets or exceeds the difficulty level set for the path between those two checkpoints.

At block 1325, in one embodiment, a determination is made that B) the user is able to successfully reach checkpoint 2 before reaching the threshold of the predetermined difficulty level. In other words, the user is able to easily surpass the difficulty level set for this stage, such as by beating the level in a shorter amount of time or fewer attempts for which the game level was designed, i.e., before reaching the threshold level. In response to such determination, at block 1335, the system may either automatically increase the level of game difficulty or provides the suggestion to the designer of the game to increase the level of difficulty for future users.

At block 1325, in one embodiment, if a determination is made that C) the user is able to reach checkpoint C2 after the threshold of the predetermined difficulty level. In other words, the user is not able to easily surpass the difficulty level set for this stage, for example, the user is taking too much time or too many attempts to reach checkpoint C2. In response to such a determination, at block 1340, the system may automatically decrease the level of game difficulty. It may also suggest to the designer of the game to decrease the level of difficulty and provide data of how long or how many attempts the current user underwent to complete the difficulty level.

Referring now to FIG. 13B, the figure depicts a flowchart of a process for comparing a current user's performance with a median user's performance based on the predetermined difficulty levels in a virtual game, in accordance with some embodiments of the disclosure.

In some embodiments, the control circuitry 420 or 428 determines which types of enhancements and modifications to perform for the virtual game or virtual experience based on how a current user performs in the virtual game or virtual experience. Reference will be made to a virtual game for sake of explanation, however processes of FIGS. 13A and 13B apply to both virtual games and any other type of virtual or extended reality experiences. The control circuitry 420 or 428 generates a virtual game on a display of an electronic device, such as an extended reality headset, and predetermines a level of difficulty level for a portion of the virtual game. The control circuitry 420 or 428 collects performance data from a plurality of users that have played the portion of the virtual game. For example, performance data may include number of points scores, levels cleared, obstacles conquered, objects interacted with, time taken to achieve a certain task or game level, and other game related metrics that can be used to determine how a player performed and whether the player did or did not do well during a segment of the game. This performance data relates to performance of plurality of users based on the predetermined difficulty level. For example, how many points did the plurality of users score under the given difficulty level, did they perform well, did they exceed the expected performance range, such as by scoring more pints that the content creator may have anticipated for the level of difficulty etc. The control circuitry 420 or 428 calculates median performance based on the performance data collected from the plurality of users and compares it to the current user's performance data. The control circuitry 420 or 428 executes a virtual game enhancement in response to determining that the current user's performance data is not within a threshold of the median performance data. These enhancements may include maintaining the same level of difficulty or increasing or decreasing the level of difficulty. To perform these embodiments, the control circuitry 420 or 428 executes the process of FIG. 13B as described below.

In some embodiment, at block 1310, control circuitry 420 or 428 may generate a virtual game environment with a predetermined level of difficulty between checkpoint one and checkpoint two of the virtual game. The predetermined level of difficulty relates to certain types of obstacles or challenges that a player of the game needs to experience in order to score point or get to the next level of the virtual game. The predetermined level of difficulty may be designed by the content creator or the control circuitry 420 or 428 such that the player experiences certain hardships to make the game challenging, for example the user may have to spend a certain amount of time, take certain amount of steps, lose certain amount of lives, take certain paths that are not easily discovered etc. to successfully pass the game level with the predetermined level of difficulty.

One example of a predetermined level of difficulty in a game includes making it difficult for clearing or passing a gaming level within a certain time period, such as in a car racing game where the curves are designed at sharp angles such that the player needs to slow down on the curves thereby cannot reach the finish line within a certain amount of time. In yet another example, the game may require certain number of attempts by the player to reach the end. In another example, the player may need to discover a certain number of assets/objects that are hidden from the player which may be revealed after the player successfully navigates to a certain area in the game.

Whatever the challenge or obstacle may be that is designed into the game to cause a certain level of difficulty, the control circuitry 420 or 428 at block 1345 obtains performance data, such as performance metrics, from a plurality of users that have played the game between checkpoints one and two with the predetermined level of difficulty. By gathering the performance data, the control circuitry 420 or 428 may determine whether the plurality of users experienced the predetermined level of difficulty that was designed in the game to be experienced by the users.

In one embodiment, the control circuitry 420 or 428 may include a threshold for the predetermined level of difficulty. For example, if a predetermined level of difficulty for a player in a car racing game is to finish the race with an average speed of 75 MPH, the threshold may be set at +/−15 MPH, which results in a threshold or performance window of a lower performance at 60 MPH and a higher performance at 90 MPH. In other embodiments, the threshold may be related to time or number of attempts. For example, if a user is to navigate from checkpoint one to two after 5 attempts, the threshold may be set at +/−2 attempts.

At block 1350, in one embodiment, the control circuitry 420 or 428 calculates the median performance based on the performance data, such as performance metrics, obtained for the plurality of users. The median performance data may be an average of all the plurality of users, a mean of all the plurality of users, a standard deviation of all the plurality of users, or some other equation to compute the median performance or some other statistical measure.

At block 1355, in one embodiment, a determination is made whether a median user, which is a hypothetical user that is determined based on calculating the median or other type of statistical data from the plurality of users, is able to successfully reach checkpoint C2 and is able to do so within the threshold of the predetermined difficulty level. In other words, is the median user able to perform at the difficulty level as expected for which the difficulty level was designed. From the example above, in a car racing game with a predetermined speed of level of difficulty set to have an average speed of 75 MPH through the game, with a threshold of +/−15 MPH, the determination by the control circuitry is to determine whether the median user was within the +/−15 MPH of 70 MPH, in other words between a lower performance at 60 MPH and a higher performance at 90 MPH.

If a determination is made that the median user competed the task, i.e., reached checkpoint two, or in the car racing example, reached the end of the race outside of the threshold, then at block 1365, the difficulty threshold may be increased or decreased based on the performance. In one embodiment, if the median user's performance came in under 60 MPH, which is the lower end of the threshold, then the control circuitry 420 or 428 may determine that the current predetermined difficulty level is too high for the median user and it needs to be decreased. In the car racing example, the control circuitry 420 or 428 may decrease the 75 MPH average speed difficulty level to 65 MPH and provide a +/−15 threshold, or some other threshold such as +/−20, to adjust the difficult level thereby making it easier for the median user to reach the game level. In other embodiments, decreasing the difficulty level may be performed by blocking certain paths in a virtual game that have a higher difficulty. In another embodiment, if the median user's performance came in at 90 MPH, which is the above the higher end of the threshold, then the control circuitry 420 or 428 may determine that the current predetermined difficulty level is low for the median user and it needs to be increased. In the car racing example, the control circuitry 420 or 428 may increase the 75 MPH average speed difficulty level to 100 MPH and provide a +/−10 threshold, or some other threshold such as +/−5 to adjust the difficult level thereby making it harder for the median user to reach the game level.

If a determination is made that the median user competed the task, i.e., reached checkpoint two, or in the car racing example, reached the end of the race within the predetermined threshold of 75 MPH, then at block 1365, the difficulty threshold may be maintained. This is because the control circuitry 420 or 428 may determine that the predetermined threshold that is currently set is the right amount of difficulty for the median user.

At block 1370, a current user's performance if compared to the updated level of difficult at block 1365 or the maintained level of difficult at block 1360 based on the determinations made at block 1355. Blocks 1375, 1385, and 1380 follow the similar process as blocks 1355, 1365, and 1360 to determine whether to increase, decrease, or maintain the same level of difficulty but based on the comparison to the updated level of difficult at block 1365 or the maintained level of difficult at block 1360, i.e., how a median user may have performed.

In one embodiment, as described through blocks 1345-1385, the control circuitry 420 or 428 may perform at least a couple iterations of checks on the predetermined level to determine whether to increase, decrease, or maintain it. The first iteration may be a check based on how a median user performs based on the predetermined difficulty level, and if that level had to be adjusted for the median user, the second iteration may be for the particular current user to determine if further adjustments from those made for the median user are needed to customize for the current user. In addition to the above, statistics that are specific to the current user, such as those depicted in FIG. 8, may also be considered in further adjusting the predetermined levels of difficulty. Other factors such as whether the current user has played similar games, is an expert in the field of such games etc, may also be factored in to adjust the difficulty level. For example, if the control circuitry 420 or 428 determines that the user is an expert in such games, then the difficulty level may be increased to make it more challenging for the current user.

In another embodiment, the control circuitry 420 or 428 may manage motion sickness in an extended reality experience by generating an extended reality experience on a display of an electronic device, such as an extended reality headset. The control circuitry 420 or 428 may determine a first checkpoint and a second checkpoint in the extended reality experience, such as the checkpoints depicted in FIG. 3. The control circuitry 420 or 428 may determine a median path (or some other representative path) based on data from a plurality of users that have navigated between the first checkpoint and the second checkpoint. It may do so by calculating an average, mean, or some other calculation based on an equation or some other statistical measure to obtain median data. The control circuitry 420 or 428 may determine a location in the median path where a threshold number of users, from the plurality of users, experienced motion sickness. For example, the median path may include several location points along the path, such as location 1-$n$ as the user navigates from the starting checkpoint to the ending checkpoint. The control circuitry 420 or 428 may determine whether the path taken by a current user is aligned with the median path. For example, the control circuitry 420 or 428 may determine if the current path is along the same location points as the path selected by the plurality of users.

The control circuitry 420 or 428 in response to determining that the current user's path is aligned with the median path may then take remedial actions prior to the user reaching the location in the median path where the threshold number of users experienced motion sickness. For example, if a path had location points 1, 2, 3, 4, and 5 and the median user experienced motion sickness at location point 4, such as due to a drop in a roller coaster etc., such data may be logged by the control circuitry 420 or 428.

The control circuitry 420 or 428 may determine that the current user is also taking the path taken by the median user. It may also determine how far the median user has progressed, for example the median user may have progressed so far by crossing location points 1, 2, and 3. The control circuitry 420 or 428 determining that the current user is on the same path and that location point 4 is where the motion sickness is experienced, may proactively perform remedial actions prior to the user reaching location point 4 such that motion sickness may be minimized or avoided as a preventative action.

In some embodiments, the control circuitry 420 or 428 may determine whether the path taken by the current user is aligned with the median path by determining a first set of coordinates of the median path and then comparing the first set of coordinates with a current set of coordinates associated with the current path taken by the user. If the control circuitry 420 or 428 makes a determination that the current set of coordinates are within a threshold distance of the first set of coordinates, then the control circuitry 420 or 428 may take remedial action. The threshold distance may be set by the content creator of the control circuitry 420 or 428.

FIG. 14 is a navigation tree that depicts routes taken by a plurality of users between predetermined checkpoints in the virtual game, in accordance with some embodiments of the disclosure.

The median path followed by users is represented in x, y, z coordinates. The median path may also include orientations in addition to translational movements of x, y, and z coordinates; however, for sake of simplicity and explanation, only x, y, z coordinates are depicted.

In some embodiments, the user's path between checkpoints C1 and C2 is determined using a general tree. For example, between checkpoints C1 and C2, the difference between 2 successive records may represent a state change in the position of the user in the 6DOF virtual experience. Starting at the root node initialized to x, y, and z coordinates of 0, 0, 0, i.e., the initial position or origin at which the virtual experience begins, the record is checked against the children of the root node. In some embodiments, if a child already exists that represents the state change in x, y and z, then it is selected as the next starting point and a count representing the traversal of the edge between the root node and its child is incremented. If a child does not exist that represents the state change in x, y and z, then a new child node is created, and the edge is attributed a count of 1. This process is carried in for each new record until checkpoint C2 is reached.

In one embodiment, a path tree may be generated based on navigation between checkpoints C1 and C2 by 12 users. The leaf node with the highest traversal count presents the final state change of the median path of the user. Traversing the tree from the root node to the leaf node with the highest traversal count determines the median path taken by users in the experience.

The traversal count of leaf node (−1,0,0) is the highest at n=5. Thus, the median path of users is modeled as a state change of (−3, −2, 0) followed by a state change of (−1, 0, 0). Accordingly, the total state change is the summation of the two resulting in a move to (−4, −2, 0).

Although discrete changes in x, y, and z coordinates are depicted, in reality, each discrete state change, i.e., a node in the general tree, may include a range/error of movements in x, y, and z directions. For example, an error of x±6x, y±6y, and z±6z may be experiences and effectively creating "zones" of user movement (like a chessboard).

FIG. 15 is block diagram depicting the field of view of user and the objects/assets encountered within the field of view, in accordance with some embodiments of the disclosure. In some embodiments, field of view (FOV) from a user's eye is depicted. In some embodiments, the content creator, in order to build a virtual experience with a good level of user engagement, must observe the patterns of the user's FOV. By determining and monitoring the user's FOV, the content creator may obtain data as to what objects are appearing in the user's FOV. Since a well-designed extended reality experience is one in which the user spends time, feels engaged, and interacts with objects in their FOV, such FOV data provides insight into whether the content creator's intended design matches users' observations and actions.

In one embodiment, a user's FOV is represented in the figure as including an entire picture plane from a left vanishing point to a right vanishing point. The vanishing points 1540 are where the user's vision is the least and the center of the pyramid of vision 1530 is where the vision is the most and towards which the eyeballs of a user may be directed. As depicted, in this example, the user's FOV includes the object 1510. The control circuitry may determine that the user's gaze is directed towards the object 1510 if a pyramid of vision, which is a narrower section than the entire FOV, of the user's eye is directed towards the object. To make such a determination, in one embodiment, the control circuitry may utilize an inward-facing camera associated with the extended reality headset to monitor the user's eyeball movements. In another embodiment, the control circuitry may determine the orientation and coordinates of the extended reality headset and then calculate the pyramid of vision, thereby determining whether the user's gaze is directed towards the object 1510.

In another embodiment, in addition to the user's pyramid of vision 1530 being directed in a particular direction, the control circuitry may also determine whether the user is viewing a near vision 1545 or a far vision 1550. Such data may allow the control circuitry to determine the depth of the user's view and whether the user is viewing objects that are closer or farther within the pyramid of vision. Such type of gaze tracking may be used with the position and rotation vectors to reduce the set of assets in view, thus improving the information available to the user and content creator. For example, the content creator may use gaze information to decide whether to remove clutter by removing objects in the background that are not germane to the game or virtual experience and are causing confusion or lack of focus for the user.

In some embodiments, the FOV is determined based on the coordinates of the headset. The control circuit may obtain the user's coordinates on the path and use them to determine the orientation of the extended reality headset. The orientation determination may allow the control circuitry to determine which object may be in the FOV. The control circuitry may further determine if the user has interacted with the objects in the FOV.

FIG. 16 is block diagram of a layout of a room and a plurality of paths taken to reach a destination, in accordance with some embodiments of the disclosure. In some embodiments, the user may user a virtual reality headset or glasses when navigating in the room to reach the destination. As depicted, the layout in one embodiment includes a couch 1610, chairs 1620, 1625, 1630 and other chairs, a table 1635, a lamp 1640, and other objects such as another lamp, and plurality of bookshelves. The figure also depicts a path 1650 taken by a first user and a path 1660 taken by a second user. The figure further depicts certain locations along the path, such as locations 1670, 1680, and 1690 through which a user passes. Checkpoint C1 may be a starting position of the path, and the goal of the virtual experience, in one embodiment, may be to get to checkpoint C2.

Since different users may take different paths from checkpoint C1 to get to checkpoint C2, they may spend different amounts of time between the two checkpoints and encounter different challenges. For example, one user may select an easier or shorter path than another, one user may lose a life while the other may pass through without losing a life, or one user may encounter more assets than another user and be able to interact with them based on the path selected. Different users may also have different experiences in discovering assets in the game. Some users may discover key assets to clear a level faster than others or in fewer attempts. Some users may enjoy an experience more, choosing to stay in it for longer in order to explore their surroundings. If the experience is a game, then one user, based on the path selected and the number of assets viewed and interacted with, may obtain more points as compared to a user who has not interacted with as many assets. The data collected for each path and by different users may be used by the content creator to enhance future virtual experiences, adjust difficulty levels, manage motion sickness, or determine home automation options.

In one embodiment, as depicted, the path navigated by User 1 is different from the path navigated by User 2. The path navigated by User 1 passes through location 1690 to get to the ultimate destination at checkpoint C2 at which a lamp 1640 is located. When User 1 navigates along Path 1, at each location along the path the user's FOV allows the user to view different assets, such as a table, chairs, lamps, and bookshelves, based on the orientation of the extended reality headset that User 1 is wearing.

In one embodiment, at location 1690, the extended reality headset of User 1 may be oriented in the direction of the arrow. Based on the orientation, the User's FOV 1655 at location 1690 may allow User 1 to see the table 1635 and chairs 1625 through their headset. User 1 may also partially see chair 1630 in their FOV. All other assets, including chair 1620, may not be visible to User 1 at location 1690 when the orientation of the headset is pointing towards the arrow. Such data may be captured by the control circuitry 420 or 428 and used for various purposes, such as to enhance future virtual experiences, adjust difficulty levels, manage motion sickness, determine home automation options, and other use cases.

Based on the orientation in the direction of the arrow at location 1690, User 1 may be able to interact with assets 1635, 1625, and 1630. If the extended reality experience is a virtual game, then the user may score points based on the user's interactions with these assets. Data relating to all user interactions with assets, including assets viewed and interacted with, assets viewed but not interacted with, and extended reality display coordinates, translational and orientation, may be captured by the control circuitry as depicted in examples of FIGS. 18 and 19. Data relating to time spent with each asset and time taken to navigate from one location to the other along Path 1 may also be captured by the control circuitry 420 or 428.

The path navigated by User 2 passes through location 1670 and 1680 to get to the ultimate destination at checkpoint C2 at which a lamp 1640 is located. The locations 1670, 1680, and 1690 are picked arbitrarily along the paths of Users 1 and 2 to describe their FOV and assets that can potentially be interacted with. Any other locations along the path may also have been picked instead for similar descriptions of FOV.

When User 2 navigates along Path 2, at each location along the path the user's FOV allows the user to view different assets, such as a table, chairs, lamp, and bookshelves, based on the orientation of the extended reality headset that User 2 is wearing.

In one embodiment, at location 1670, the extended reality headset of User 2 may be oriented in the direction of the arrow. Based on the orientation, the User's FOV 1665 at location 1670 may allow User 2 to view bookshelf 2 and partially view bookshelf 3, thereby creating opportunities for User 2 to interact with them. All other assets, including bookshelf 1, may not be visible to User 2 at location 1670 when the orientation of the headset is pointing towards the arrow.

As User 2 progresses along a path selected by User 2 in the extended reality experience, in one embodiment, at location 1680, the extended reality headset of User 2 may be oriented in the direction of the arrow which may allow User 2 to view only bookshelf 2 in their FOV. As such, User 2 in this orientation may have the opportunity to interact only with bookshelf 2 (if they so choose).

User 2 navigation data, including what User 2 viewed in their FOV at all locations and the opportunities that were available to User 2 based on what they viewed in their FOV, may be captured by the control circuitry 420 or 428 and used for various purposes, such as to enhance future virtual experiences, adjust difficulty levels, manage motion sickness, determine home automation options, and other use cases.

In some embodiments, User 2 may have taken a shorter path than User 1, however User 1 may have the opportunity to interact with more assets than User 2. If asset interaction is solely captured based on the selected location points 1670, 1680, and 1690, in one embodiment, User 1 may have interacted with more assets (three chairs and a table) while User 2 may have interacted with only two items (Bookshelf 2 and 3). Depending on how the content creator designed the extended reality game, if equal points were allocated for each asset interacted with, then User 1 may obtain more points that User 2 based on their number of interactions. However, if a higher number of points were allocated for bookshelves than other objects, in one embodiment, User 2 having interacted with the bookshelves may obtain more points than User 1 that selected a path in which they did not view or interact with any bookshelves. In another embodiment, if the length of the path or the time it takes to reach from checkpoints C1 to C2 was given a higher value, then User 2 may gain more points than User 1 for taking a shorter path and reaching the destination in a shorter amount of time. In another embodiment, each step along a path may have a different FOV, and the control circuitry may obtain data relating to the assets in the FOV along each step and determine which assets were in view and which assets were interacted with to generate a table such as the table shown in FIGS. 18 and 19.

In one embodiment, the user navigation and path may be monitored by the control circuitry 420 or 428 on a period or continuous basis. The monitoring may be performed for each and every move and orientation of the extended reality headset.

In another embodiment, the control circuitry 420 or 428 may modify the time period of monitoring and logging based on the scene complexity or interaction opportunities (based on path, orientation, assets in view, interaction opportunities, etc.). The control circuitry 420 or 428 may also log data more frequently when the scene complexity is high, and less frequently when it is low.

In yet another embodiment, path monitoring and data logging may be at certain predetermined locations or periodically after certain time frames to manage CPU and GPU utilization such that they are not overloaded. The amount of data collected may also be capped by an allocated amount of memory space to be used in the CPU or GPU.

In addition to path data, the control circuitry 420 or 428 may also monitor and log data relating to motion sickness, home automation opportunities, difficulty status, etc. Control circuitry 420 or 428 may also log data such as heart rate, ECG, and other user vitals to obtain more insight into the content. The control circuitry 420 or 428 may also track the user's gaze along with the position and rotation vectors to determine (and in some instances reduce) the set of assets in view. An example of a table of the logged data is depicted in FIGS. 18 and 19.

The control circuitry 420 or 428 may use the data collected and logged to optimize the content once the median path taken by users, the median orientation for each point along that path, the assets in view, and the CPU/GPU utilization are determined. If there are assets rendered in very high detail (e.g., millions of polygons) that are not often in the FOV of the user, in certain time periods the control circuitry 420 or 428 may observe a peak GPU utilization and take appropriate actions to reduce the level of detail of the high-detail assets or remove them altogether.

In some embodiments, the control circuitry 420 or 428 may determine that the CPU or GPU utilization is higher than anticipated or above a predetermined threshold. Having such utilization over a threshold may be an indication that the GPU may not be able to deliver rendered frames at the rate required to maintain a consistent frames per second in the experience, thereby resulting in the GPU skipping frames, thus adversely affecting the user experience. In such circumstances, the control circuitry 420 or 428 may reduce the complexity, detail, resolution, and/or number of polygons used to avoid overexertion of the GPU.

In some embodiments, upon the control circuitry 420 or 428 determining that the CPU or GPU utilization is higher than anticipated or above a predetermined threshold, the control circuitry 420 or 428 may change spatial arrangement of the assets or the layout partially or altogether. For example, in FIG. 16, the control circuitry 420 or 428 may remove the additional number of chairs that were not viewed or interacted with or may relocate them to another side of the virtual room. The control circuitry 420 or 428 may also lessen the amount of detail of the lamp on the left side of the room that was not viewed or interacted with, or it may move its spatial layout to closer to a median path such that it increases the opportunity for it to be viewed and interacted with. Some additional layout changes that can be implemented are described in FIG. 17 below.

In some embodiments, upon the control circuitry 420 or 428 determining that the CPU or GPU utilization is higher than anticipated or above a predetermined threshold, the control circuitry 420 or 428 may reduce the number of times data is collected and logged and collect and log data on a periodic basis, at timed intervals, or infrequently when a scene is changed or when a milestone is achieved.

Figure 17:
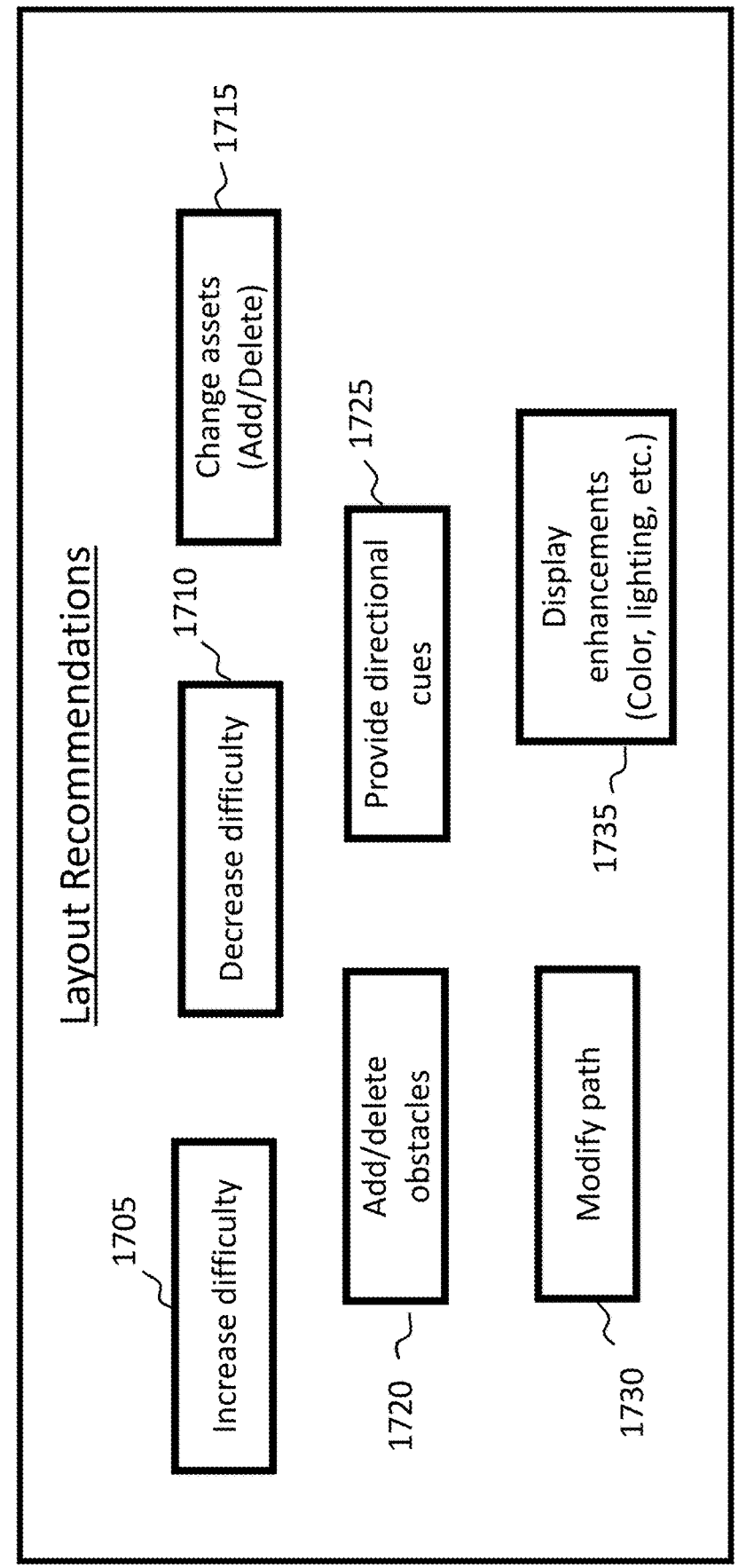
FIG. 17 is block diagram of layout recommendations, in accordance with some embodiments of the disclosure.

FIG. 17 is block diagram of layout recommendations, in accordance with some embodiments of the disclosure.

In some embodiments, at block 1705, the control circuitry 420 or 428 changes the layout in the extended reality experience by increasing the difficulty level. As mentioned earlier, one of the reasons for obtaining data from the plurality of users as they navigate from checkpoints C1 to C2 is to determine whether the plurality of users have experienced the level of difficulty as designed and anticipated by the creator of the extended reality experience, such as in a VR game. If a determination is made by the control circuitry 420 or 428 that the plurality of users have conquered the challenges and obstacles designed by the content creator and reached checkpoint C2, such as in under the threshold time designed for experiencing a certain difficulty level, or scored more points than designed, then the control circuitry 420 or 428 may increase the difficulty level. Having the plurality of users overcome the difficulties of the game as designed may be an indication that the difficulty level is easy for users to get by, and as such, the control circuitry 420 or 428 may increase the difficulty level for a more challenging experience.

In some embodiments, at block 1710, the control circuitry 420 or 428 changes the layout in the extended reality experience by decreasing the difficulty level. As mentioned earlier, one of the reasons for obtaining data, such as performance metrics, from the plurality of users as they navigate from checkpoints C1 to C2 is to determine whether the plurality of users have experienced the level of difficulty as designed and anticipated by the creator of the extended reality experience, such as in a VR game. If a determination is made by the control circuitry 420 or 428 that the plurality of users had difficulty conquering the challenges and obstacles designed by the content creator and reaching checkpoint C2, such as in over the threshold time designed for experiencing a certain difficulty level, or scored fewer points than designed, or if several users abandoned the game due to the level of difficulty, then the control circuitry 420 or 428 may decrease the difficulty level such that users can get to checkpoint C2 with less difficulty.

In some embodiments, at block 1715, the control circuitry 420 or 428 changes the layout in the extended reality experience by changing the assets in the layout, such as by adding or deleting assets. For example, the control circuitry 420 or 428 may determine that certain assets are not of interest to the plurality of users, and as such they have not been interacted with. In another example, the control circuitry 420 or 428 may determine that additional assets are adding more processing for the CPU or GPU and are not essential to the extended reality experience. In yet other example, the control circuitry 420 or 428 may determine that by adding more assets, a higher level of difficulty is added. Whatever the reason may be for adding or deleting assets, the control circuitry 420 or 428 may do so based on performance metric data collected from the plurality of users as they navigate from checkpoints C1 to C2.

Similar to adding or deleting assets, the control circuitry, at block 1720, may add or delete obstacles. One of the reasons to add or delete obstacles may be to increase or decrease the difficulty level. For example, if the control circuitry 420 or 428 determines that the plurality of users have solved the current challenges or bypassed the obstacles under the threshold time designed for solving such challenges or bypassing such obstacles, then more obstacles may be added. In another example, if the control circuitry 420 or 428 determines that the plurality of users have not solved the current challenges or bypassed the current obstacles or have done so in an amount of time that exceeds a predetermined threshold time designed for solving such challenges or bypassing such obstacles, then obstacles may be deleted. Obstacles may also be deleted if the users have abandoned the game and not solved any challenges of bypassed obstacles.

In some embodiments, at block 1725, the control circuitry 420 or 428 instead of changing the layout in the extended reality experience or in addition to changing the layout, may provide translational or directional cues to the user. As depicted in FIG. 15, an arrow 1520 may direct the user to orient towards an object if the user has not been able to figure out where the object is located within a threshold amount of time. Having translational cues may also be an option that the control circuitry 420 or 428 may activate if it determines that the user is trying to abandon the game or is proceeding in a wrong direction.

In some embodiments, at block 1730, the control circuitry 420 or 428 changes the layout in the extended reality experience by modifying the possible path that a user can take to get to the end checkpoint C2. For example, if a determination is made by the control circuitry 420 or 428 that the plurality of users have been going down a path that is a wrong path or a path that is causing them to exceed the threshold amount of time in which to reach checkpoint C2, then the control circuitry 420 or 428 may block off the wrong path, create another detour in the path that leads the user back to the right path, or provide a sign that the path is a wrong path.

In some embodiments, at block 1735, the control circuitry 420 or 428 may display enhancement that includes coloring, highlighting, animating, increasing the size, or any other enhancement that would draw attention to an object that is to be found by the plurality of users. Although some layout changes and modification of path and enhancements are discussed in FIG. 17, the embodiments are not so limited, and other enhancement that change the layout or draw attention to a particular area in the extended reality experience are also contemplated.

FIG. 18 is table of user navigation coordinates of the user's interactions as the user navigates from checkpoint C1 to checkpoint C2, in accordance with some embodiments of the disclosure.

In one embodiment, the control circuitry 420 or 428 may collect data based on the plurality of users' navigation from checkpoint C1 to checkpoint C2. Such data may be aggregated, a mean for the data calculated, and the mean used to compare the current user's data and determine what types of changes and enhancements to the extended reality experience are needed to make the current user's experience enhanced and more enjoyable.

In one embodiment, control circuitry 420 or 428 may use the collected data based on the plurality of users' navigation from checkpoint C1 to checkpoint C2 and generate the table 1800. Although a few columns of categories have been listed in table 1800, the embodiments are not so limited, and other columns that reflect data for other measurements and indications may also be populated in the table. For example, data relating to acceleration, motion sickness, etc., may also be populated in the table 1800.

In some embodiments, the data contains position and orientation of the system components, e.g., a head-mounted display (TIMID) (which is the extended reality device used by the user), Left Hand and Right Hand Controller (such as a virtual or extended reality gaming controller), the assets in view (such as the table and chairs in FIG. 16), as well as a history of user activity at each recorded point in the simulation. It also includes CPU and GPU utilization based on the path taken by the user and the amount of CPU and GPU usage required to render images and process the user's steps. In other embodiments, instead of recording data at each point, which may overconsume the memory and CPU/GPU usage, the control circuitry 420 or 428 may reduce the number of times data is collected and logged and collect and log data on a periodic basis, at timed intervals, or infrequently when a scene is changed or when a milestone is achieved.

For example, in a hypothetical experience, a 3D scene containing a large number of boxes (some of these boxes are "flying" boxes) may be displayed as part of a VR game. These flying boxes may appear transiently. In addition, the control circuitry 420 or 428 may provide the user with the capability to open and close any of the boxes using a point-and-click action on the virtual or extended reality controller. When the user performs the actions relating to the flying boxes, such as the user pointing and clicking with their mouse, the control circuitry 420 or 428 may extract a table from each log file such as table 1800.

The control circuitry 420 or 428 may then aggregate the logs received from the plurality of users, thereby providing the content creator a comprehensive view of user behavior in the extended reality experience. As mentioned above, the comprehensive view may be used for managing a user's motion sickness, performing home automation, or gauging a user's performance through the designed difficulty levels of the experience.

On a granular basis, in one embodiment, the control circuitry 420 or 428 may use the aggregated data, which provides a comprehensive view, to determine a median path of the user. As mentioned earlier, such median path is calculated based on an average or a mean for the data obtained from the plurality of users and their path taken.

In another embodiment, the control circuitry 420 or 428 may use the aggregated data to determine median orientations of users (qw, qx, qy, qz) at each point (or some points) on the median path. The orientations allow the control circuitry 420 or 428 to determine the direction in which the extended reality device (HMD) is facing and based on that facing direction determine which assets are in the FOV of the user.

In yet another embodiment, the control circuitry 420 or 428 may use the aggregated data to determine which assets were viewed by the users and the duration of such viewing. For example, in some instances, a user may view an asset only for a small duration of time and not interact with the object, and in other instances the user may spend a lot of time with the asset leading the user to eventually interact with the asset. The control circuitry may determine an average based on the plurality of users and determine whether the asset is on an average of interest to the users.

In another embodiment, the control circuitry 420 or 428 may use the aggregated data to determine whether the plurality of users took the opportunity to interact with assets that were programmed to be interacted with. If the assets are not being interacted with, the control circuitry 420 or 428 may displace them to a different spatial location, remove them from the game, or lessen the amount of detail, such as polygons, for the asset.

In another embodiment, the control circuitry 420 or 428 may use the aggregated data to determine large changes in x, y, z (high translational movement) across successive time periods. Determining such large changes may allow the content giver an understanding of whether a large translational movement, which implies faster movement or a jump from one location to another, is leading to motion sickness in the user. The content giver may use such data to determine whether any enhancements relating motion sickness are required. Likewise, large changes in qw, qx, qy, qz (high angular movement) across successive time periods may also be monitored, recorded, and used to determine any actions needed. Additionally, the data relating to time rate of change-of-position movement and angular movement due to the large movements allows a content creator a sense of where the content creator may reduce events that occur in the user experience to control abnormal/high movement in the game.

In yet another embodiment, the control circuitry 420 or 428 may use the aggregated data to determine time taken to complete a set of tasks or a sequence of tasks or time taken between completing tasks. Determining such data relating to task completions times may allow the control circuitry to determine whether a user is achieving the task with less difficulty than that for which the level is designed or if the difficulty is too complex for the user, leading to the user spending more than the threshold time or abandoning the game.

In some embodiments, the time taken to complete a set of tasks or sequence of tasks may present the total time spent between checkpoints C1 and C2. When a user reaches checkpoint C2, a timestamped entry may be made to indicate the achievement. When a user exits the experience before reaching checkpoint C2, the absence of this entry in the log file may be entered and such entry may indicate that the user did not complete the tasks to reach checkpoint C2. Aggregation of such data may be used to evaluate and adjust the difficulty level in the experience.

Likewise, data relating to time taken between completing two individual tasks from the Interactions/User Activity column may be obtained and logged. In some embodiments, if after performing the first task, i.e., "Open (Box-7)", a user receives a clue that leads the user to perform a second task, i.e., "Open (Box-11)", then the control circuitry may use such data to determine how many user sessions out of the total were successful in interpreting this clue. The timestamps that are recorded for user actions may be used by the control circuitry to determine the time between completing two tasks.

FIG. 19 is table of user interactions and missed opportunities, in accordance with some embodiments of the disclosure.

In one embodiment, at time t=T, the assets in the FOV of the user may be Box-1, Box-2, Box-3, Box-4, Flying-Box-1. The interaction opportunities provided to the user in the game may be to Open (Box-1), Open (Box-2), Open (Box-3), Open (Box-4), Open (Flying-Box-1). However, as depicted in the third column "Interactions/User Activity", the user took zero opportunities in the first time interval.

In another embodiment, at time t=2T, the user took one out of five possible opportunities in the second time interval, and in yet another embodiment, at time t=3T, the user took three out of five opportunities in the third time interval. Such aggregated data may be used to draw inferences on whether the users are taking the opportunities provided, and if so, which opportunities are being taken and which are not.

FIG. 20 is table of content improvement suggestions based on users' navigation in the extended reality experience, in accordance with some embodiments of the disclosure. In this embodiment, the control circuitry 420 or 428, based on the metrics or data obtained from the plurality of users, provide content improvement suggestions, and/or suggested actions. Some example content improvement suggestion include the control circuitry suggesting to highlight an object to redirect the user towards it or get them to interact with it or perform a desired action or train to perform a certain behavior. Some exemplary suggested actions include the control circuitry suggesting displaying arrows, highlight objects with a thick/contrasting color border to point the user to the assets or other interaction opportunities, changing the spatial layout/map of the experience, or providing behavioral training text and 3D visualization.

Figure 21:
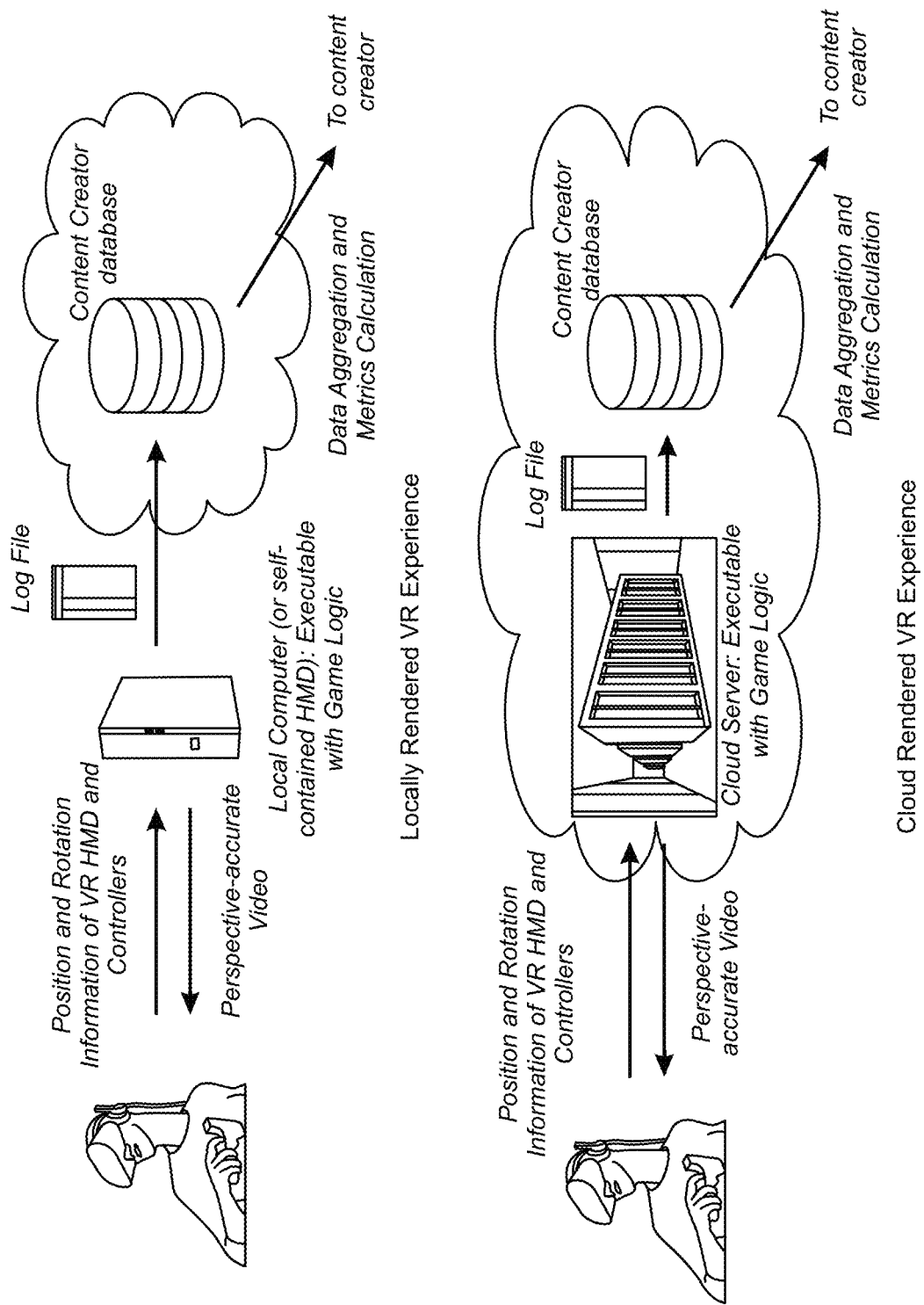
FIG. 21 is block diagram depicting locally rendered and cloud rendered extended reality experiences, in accordance with some embodiments of the disclosure.

FIG. 21 is block diagram depicting locally rendered and cloud rendered extended reality experiences, in accordance with some embodiments of the disclosure.

The location where the data is logged and the mechanism of uploading data to the content creator may depend on the system architecture. In some embodiments, in a cloud rendered VR experience, the data may be logged directly at the cloud server that receives the position and orientation data to render frames for the extended reality headset. In other embodiments, while in a locally rendered extended reality experience, the data may be logged in a local computer or the extended reality device and later uploaded to the system, such as the system depicted in FIG. 4. Storage on remote servers or attachments to the extended reality device are also contemplated in the embodiments.

It will be apparent to those of ordinary skill in the art that methods involved in the above-described embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed:

1. A method of enhancing a virtual reality experience comprising:
    generating a virtual game on a display of an electronic device, wherein a predetermined difficulty level is determined for a portion of the virtual game;
    collecting performance data from a plurality of users that have played the portion of the virtual game, wherein the performance data relates to performance of plurality of users based on the predetermined difficulty level;
    calculating performance metric based on the performance data collected from the plurality of users;
    comparing a current user's performance data with the calculated performance metric; and
    executing a virtual game enhancement in response to determining that the current user's performance data is not within a threshold of the performance metric.

2. The method of claim 1, wherein the threshold of the performance metric includes lower limit and an upper limit, wherein the lower limit is associated with a minimum number of interactions with virtual objects in the virtual game and the upper limit is associated with a maximum number of interactions with virtual objects in the virtual game.

3. The method of claim 2, further comprising:
    determining that the current user's performance data is below the lower limit of the threshold of the performance metric; and
    in response to the determination, modifying the predetermined difficulty level for the portion of the virtual game to a lower predetermined difficulty level.

4. The method of claim 2, further comprising:
    determining that the current user's performance data is above the higher limit of the threshold of the performance metric; and
    in response to the determination, modifying the predetermined difficulty level for the portion of the virtual game to a higher predetermined difficulty level.

5. The method of claim 1, wherein the portion of the virtual game includes a starting checkpoint and an ending checkpoint, wherein the starting and ending checkpoints are determined based on a type of the virtual game.

6. The method of claim 5, further comprising, selecting the starting and ending checkpoints with a shorter span of time for a faster paced virtual game and a comparatively longer span of time for a slower paced virtual game.

7. The method of claim 1, further comprising:
    monitoring the current user's path in the virtual game;
    determining a total number of interaction opportunities available based on the path taken by the current user in the virtual game; and
    determining a number of interaction opportunities availed by the current user from the total number of interaction opportunities available.

8. The method of claim 7, wherein the current user's performance is based on the number of interaction opportunities executed by the current user from the total number of interaction opportunities available to the current user.

9. The method of claim 1, further comprising:
    monitoring the current user's gaze as the user navigates a path in the virtual game;
    determining objects in a field of view (FOV) of the current user based on the path navigated by the current user in the virtual game; and
    determining whether the user interacted with an object in the FOV.

10. The method of claim 1, wherein monitoring the user's progress comprises:
    determining coordinates of a path taken by the user in the virtual game;
    based on the coordinates, determining an orientation of a headset worn by the current user for playing the virtual game;
    determining an object in the field of view of the headset based on its determined orientation; and
    determining whether the current user has interacted with the determined object.

11. A method comprising:
    generating a virtual game on a display of an electronic device;
    determining a level of difficulty between a starting and an ending checkpoint for a portion of the virtual game;
    monitoring a user's progress in the virtual game to determine whether the user is on track to a) meet the determined level of difficulty, b) fall short by not being able to meet the level of difficulty, or c) exceeding the level of difficulty; and
    in response to the determination maintaining, decreasing, or increasing the level of difficulty.

12. A system of enhancing a virtual reality experience comprising:
    communications circuitry configured to access an electronic device; and
    control circuitry configured to:
        generate a virtual game on a display of the electronic device, wherein a predetermined difficulty level is determined for a portion of the virtual game;
        collect performance data from a plurality of users that have played the portion of the virtual game, wherein the performance data relates to performance of plurality of users based on the predetermined difficulty level;
        calculate performance metric based on the performance data collected from the plurality of users;
        compare a current user's performance data with the calculated performance metric; and
    execute a virtual game enhancement in response to determining that the current user's performance data is not within a threshold of the performance metric.

13. The system of claim 12, wherein the threshold of the performance metric includes lower limit and an upper limit, wherein the lower limit is associated with a minimum number of interactions with virtual objects in the virtual game and the upper limit is associated with a maximum number of interactions with virtual objects in the virtual game.

14. The system of claim 13, further comprising, the control circuitry configured to:

determine that the current user's performance data is below the lower limit of the threshold of the performance metric; and in response to the determination, modify the predetermined difficulty level for the portion of the virtual game to a lower predetermined difficulty level.

15. The system of claim 13, further comprising, the control circuitry configured to:

determine that the current user's performance data is above the higher limit of the threshold of the performance metric; and in response to the determination, modify the predetermined difficulty level for the portion of the virtual game to a higher predetermined difficulty level.

16. The system of claim 12, wherein the virtual game enhancement is performed by the control circuitry configured by either increasing or decreasing the predetermined difficulty level.

17. The system of claim 12, wherein the portion of the virtual game includes a starting checkpoint and an ending checkpoint, wherein the starting and ending checkpoints are determined by the control circuitry based on a type of the virtual game.

18. The system of claim 17, further comprising, the control circuitry configured to select the starting and ending checkpoints with a shorter span of time for a faster paced virtual game and a comparatively longer span of time for a slower paced virtual game.

19. The system of claim 12, further comprising, the control circuitry configured to:

monitor the current user's path in the virtual game;

determine a total number of interaction opportunities available based on the path taken by the current user in the virtual game; and determine a number of interaction opportunities availed by the current user from the total number of interaction opportunities available.

20. The system of claim 19, wherein the current user's performance is based on the number of interaction opportunities executed by the current user from the total number of interaction opportunities available to the current user.

21. The system of claim 12, further comprising, the control circuitry configured to:

monitor the current user's gaze as the user navigates a path in the virtual game;

determine objects in a field of view (FOV) of the current user based on the path navigated by the current user in the virtual game; and determine whether the user interacted with an object in the FOV.

\* \* \* \* \*